US012801895B2

(12) United States Patent
Shrivastava et al.

(10) Patent No.: US 12,801,895 B2
(45) Date of Patent: Nov. 17, 2026

(54) REAL-TIME SEGMENTATION OF TIME SERIES DATA USING SPARSE GRAPH RECOVERY ALGORITHMS

(71) Applicant: Microsoft Technology Licensing, LLC, Redmond, WA (US)

(72) Inventors: Harsh Shrivastava, Redmond, WA (US); Shima Imani, Sammamish, WA (US)

(73) Assignee: Microsoft Technology Licensing, LLC, Redmond, WA (US)

( * ) Notice: Subject to any disclaimer, the term of this patent is extended or adjusted under 35 U.S.C. 154(b) by 708 days.

(21) Appl. No.: 18/303,280

(22) Filed: Apr. 19, 2023

(65) Prior Publication Data

US 2024/0354551 A1 Oct. 24, 2024

(51) Int. Cl.
*G06N 3/045* (2023.01)

(52) U.S. Cl.
CPC .................................... *G06N 3/045* (2023.01)

(58) Field of Classification Search
CPC ...................................................... G06N 3/045
See application file for complete search history.

(56) References Cited

U.S. PATENT DOCUMENTS 6,928,398 B1 * 8/2005 Fang ....................... G06F 17/18 703/2
11,163,747 B2 * 11/2021 Shahand ............. G06F 11/3409
11,620,493 B2 * 4/2023 Buesser ............... G06N 3/0442 706/15
2020/0372024 A1 11/2020 Kulkarni
2022/0058465 A1 * 2/2022 Sen .......................... G06N 3/09
2022/0383145 A1 * 12/2022 Sen ........................ G06N 3/045
2023/0176939 A1 * 6/2023 Rosenkranz ......... G06N 3/0455 714/26
2024/0054348 A1 * 2/2024 Fu ............................ G06N 3/08
(Continued)

OTHER PUBLICATIONS

Aluru, et al., "EnGRaiN: A Supervised Ensemble Learning Method for Recovery of Large-Scale Gene Regulatory Networks", In Journal of Bioinformatics, vol. 38, Issue 5, Dec. 9, 2021, pp. 1312-1319.
(Continued)

*Primary Examiner* — David E Choi
(74) *Attorney, Agent, or Firm* — Ray Quinney & Nebeker P.C.; Christopher K. Hallstrom

(57) ABSTRACT

This disclosure relates to a real-time segmentation system that utilizes graph objects and models to efficiently and accurately generate segmented real-time time series data. The real-time segmentation system achieves this by efficiently generating new current graph objects as data points are received using a graph recovery model. Additionally, the real-time segmentation system removes previously generated graph objects beyond the current graph object and the previous graph object to reduce the amount of stored data. These object graphs can include conditional independence (CI) graphs, which are probabilistic graphical models that include nodes connected by edges to exhibit partial correlations between the nodes. Furthermore, the time series segmentation system determines segmentation timestamps from the graph objects using a similarity model.

20 Claims, 11 Drawing Sheets

(56) References Cited

U.S. PATENT DOCUMENTS

| | | | | |
|---|---|---|---|---|
| 2024/0144090 | A1* | 5/2024 | Chen | G06N 20/00 |
| 2024/0153006 | A1* | 5/2024 | Zhu | G06N 20/00 |
| 2024/0160160 | A1 | 5/2024 | Tan | |
| 2024/0320479 | A1 | 9/2024 | Imani | |
| 2024/0354551 | A1* | 10/2024 | Shrivastava | G06N 3/045 |
| 2024/0411779 | A1* | 12/2024 | Shrivastava | G06F 16/26 |
| 2025/0245514 | A1* | 7/2025 | Magill | G06N 3/048 |
| 2025/0252288 | A1* | 8/2025 | Woo | G06Q 10/04 |

OTHER PUBLICATIONS

Aminikhanghahi, et al., "A Survey of Methods for Time Series Change Point Detection", In Journal of Knowledge and information systems, vol. 51, Issue 2, May 2017, pp. 339-367.
Aoki, et al., "Segmentation of Human Upper Body Movement Using Multiple IMU Sensors", In Proceedings of the 38th Annual International Conference of the IEEE Engineering in Medicine and Biology Society, Aug. 16, 2016, pp. 3163-3166.
Deldari, et al., "Espresso: Entropy and Shape Aware Time-Series Segmentation for Processing Heterogeneous Sensor Data", In Proceedings of the ACM on Interactive, Mobile, Wearable and Ubiquitous Technologies, Sep. 4, 2020, 24 Pages.
Ermshaus, et al., "ClaSP—Parameter-free Time Series Segmentation", In Repository of arXiv:2207.13987v2, Nov. 18, 2022, 43 Pages.
Friedman, et al., "Sparse inverse covariance estimation with the graphical lasso", In Journal of Biostatistics, vol. 9, Issue 3, Dec. 12, 2007, pp. 432-441.
Gharghabi, et al., "Domain Agnostic Online Semantic Segmentation for Multi-Dimensional Time Series", In Proceedings of Data Mining and Knowledge Discovery, Jan. 15, 2019, pp. 96-130.
Hallac, et al., "Greedy Gaussian Segmentation of Multivariate Time Series", In Proceedings of the Advances in Data Analysis and Classification, Sep. 1, 2019, pp. 727-751.
Hallac, et al., "Network Inference via the Time-Varying Graphical Lasso", In Proceedings of the 23rd ACM SIGKDD International Conference on Knowledge Discovery and Data Mining, Aug. 13, 2017, pp. 205-213.
Harguess, et al., "Semantic Labeling of Track Events Using Time Series Segmentation and Shape Analysis", In Proceedings of the 16th IEEE International Conference on Image Processing, Nov. 7, 2009, pp. 4317-4320.
Haury, et al., "TIGRESS: Trustful Inference of Gene REgulation using Stability Selection", In Journal of BMC systems biology, vol. 6, Issue 1, Nov. 22, 2012, 17 Pages.
Imani, et al., "Multi-Window-Finder: Domain Agnostic Window Size for Time Series Data", In Proceedings of the MileTS 21, Aug. 14, 2021, 5 Pages.
Keadle, et al., "Validation of Wearable Monitors for Assessing Sedentary Behavior", In Journal of Medicine & Science In Sports & Exercise, vol. 43, Issue 8, Aug. 1, 2011, pp. 1561-1567.
Koller, et al., "Probabilistic graphical models: principles and techniques", Published by MIT press, Jul. 31, 2009, 16 Pages.
Lan, et al., "Automated Human Motion Segmentation via Motion Regularities", In Proceedings of the Visual Computer, Jan. 31, 2015, pp. 35-53.
Lin, et al., "Movement Primitive Segmentation for Human Motion Modeling: A Framework for Analysis", In Proceedings of the IEEE Transactions on Human-Machine Systems, Jan. 7, 2016, pp. 325-339.
Moerman, et al., "GRNBoost2 and Arboreto: Efficient and Scalable Inference of Gene Regulatory Networks", In Journal of Bioinformatics, vol. 35, Issue 12, Nov. 15, 2018, pp. 2159-2161.
Omranian, et al., "Segmentation of Biological Multivariate Time-Series Data", In Journal of Scientific Reports, vol. 5, Issue 1, Mar. 11, 2015, 6 Pages.
Pu, et al., "Learning to Learn Graph Topologies", In Journal of Advances in Neural Information Processing Systems, vol. 34, Dec. 6, 2021, 14 Pages.
Reinhardt, et al., "Predicting the Power Consumption of Electric Appliances Through Time Series Pattern Matching", In Proceedings of the 5th ACM Workshop on Embedded Systems For Energy-Efficient Buildings, Nov. 11, 2013, 2 Pages.
Rolfs, et al., "Iterative Thresholding Algorithm for Sparse Inverse Covariance Estimation", In Proceedings of Advances in Neural Information Processing Systems, Dec. 3, 2012, 9 Pages.
Serra, et al., "Unsupervised Music Structure Annotation by Time Series Structure Features and Segment Similarity", In Proceedings of the IEEE Transactions on Multimedia, Mar. 11, 2014, pp. 1229-1240.
Shafer, et al., "Clasp—Time Series Segmentation", In Proceedings of the 30th ACM International Conference on Information & Knowledge Management, Oct. 26, 2021, pp. 1578-1587.
Shrivastava, et al., "A Deep Learning Approach To Recover Conditional Independence Graphs", In Proceedings of the NeurIPS Workshop: New Frontiers in Graph Learning, Dec. 2, 2022, 16 Pages.
Shrivastava, et al., "GLAD: Learning Sparse Graph Recovery", In Repository of arXiv:1906.00271v1, Jun. 1, 2019, 20 Pages.
Shrivastava, et al., "GRNUlar: A Deep Learning Framework for Recovering Single-Cell Gene Regulatory Networks", In Journal of Computational Biology, vol. 29, Issue 1, Jan. 1, 2022, pp. 27-44.
Shrivastava, et al., "Grnular: Gene Regulatory Network Reconstruction using Unrolled Algorithm From Single Cell RNA-Sequencing Data", In Repository of bioRxiv, Apr. 25, 2020, 10 Pages.
Shrivastava, et al., "Methods for Recovering Conditional Independence Graphs: A Survey", In Repository of arXiv:2211.06829v1, Nov. 13, 2022, 14 Pages.
Shrivastava, et al., "Neural Graph Revealers", In Repository of arXiv:2302.13582v2, Feb. 28, 2023, 13 Pages.
Shrivastava, et al., "Neural Graphical Models", In Repository of arXiv:2210.00453v1, Oct. 2, 2022, 16 Pages.
Shrivastava, Harsh, "On Using Inductive Biases For Designing Deep Learning Architectures", A Dissertation Submitted for the Partial Fulfillment of the Requirements for the Degree Doctor of Philosophy in Machine Learning, Georgia Institute of Technology, May 2021, 135 Pages.
Shrivastava, et al., "uGLAD: Sparse Graph Recovery by Optimizing Deep Unrolled Networks", In Repository of arXiv:2205.11610v1, May 23, 2022, 17 Pages.
Thu, et al., "Inferring Regula-Tory Networks from Expression Data Using Tree-Based Methods", In Journal of PloS one, vol. 5, Issue 9, Sep. 28, 2010, 10 Pages.
Yeh, et al., "Matrix Profile I: All Pairs Similarity Joins for Time Series: A Unifying View That Includes Motifs, Discords and Shapelets", In Proceedings of IEEE 16th International Conference on Data Mining, Dec. 12, 2016, pp. 1317-1322.
U.S. Appl. No. 18/189,933, filed Mar. 24, 2023.
U.S. Appl. No. 18/186,715, filed Mar. 20, 2023.
Dai, et al., "Testing Stationarity of Brain Functional Connectivity Using Change-Point Detection in fMRI Data", Proceedings of the IEEE Conference on Computer Vision and Pattern Recognition (CVPR) Workshops, 2016, pp. 19-27.
Hinne, et al., "Bayesian Estimation of Conditional Independence Graphs Improves Functional Connectivity Estimates", PLoS Computational Biology, vol. 11, Issue 11, Nov. 5, 2015, pp. 1-26.
Imani, et al., "Are uGLAD? Time will tell!", arXiv preprint arXiv:2303.11647, Mar. 21, 2023, pp. 1-10.
Imani, et al., "Are uGLAD? Time will tell!", arXiv preprint arXiv:2303.11647, Mar. 21, 2024, 10 pages.
Imani, et al., "tGLAD: A Sparse Graph Recovery Based Approach for Multivariate Time Series Segmentation", International Workshop on Advanced Analytics and Learning on Temporal Data, Dec. 2023, pp. 176-189.
International Search Report and Written Opinion received for PCT Application No. PCT/US2024/019624, Jul. 8, 2024, 15 pages.
International Search Report and Written Opinion received for PCT Application No. PCT/US2024/021257, Jul. 8, 2024, 13 pages.
Reitblat David, "Master of Science", Master Thesis, Jan. 30, 2019, 50 pages.

(56) References Cited

OTHER PUBLICATIONS

International Preliminary Report on Patentability (Chapter I) received for PCT Application No. PCT/US2024/019624, mailed on Oct. 2, 2025, 10 pages.
International Preliminary Report on Patentability (Chapter I) received for PCT Application No. PCT/US2024/021257, mailed on Oct. 30, 2025, 09 Pages.
"An Adjacency Matrix", Runestone, 2022, 1 page.
Brownlee, Jason, "A Gentle Introduction to Mini-Batch Gradient Descent and How to Configure Batch Size", Machine Learning Mastery, Aug. 19, 2019, 4 pages.
Chen, et al., "Unsupervised Multimodal Change Detection Based on Structural Relationship Graph Representation Learning", IEEE Transactions on Geoscience and Remote Sensing, vol. 60, 2022, 18 pages.
Freidenreich, Jennifer, "Absolute Value Equations and Inequalities as Applied to Distance", LibreTexts Mathematics, 2021, 4 pages.
Non-Final Office Action mailed on Feb. 12, 2026, in U.S. Appl. No. 18/186,715, 50 pages.
Ottersten, et al., "Accurate Changing Point Detection for $\ell 1$ Mean Filtering", IEEE Signal Processing Letters, vol. 23, No. 2, 2016, pp. 297-301.
Shrivastava, et al., "GLAD: Learning Sparse Graph Recovery", International Conference on Learning Representations, 2020, 22 pages.
Final Office Action mailed on Jul. 21, 2026, in U.S. Appl. No. 18/186,715, 40 pages.
Sulem, et al., "Graph similarity learning for change-point detection in dynamic networks", In Repository of arXiv:2203.15470v1, Mar. 29, 2022, 33 pages.

* cited by examiner

REAL-TIME SEGMENTATION OF TIME SERIES DATA USING SPARSE GRAPH RECOVERY ALGORITHMS

BACKGROUND

Time series segmentation involves dividing a time series into multiple segments based on various patterns or characteristics, providing several benefits such as effectively managing long time series and identifying unexpected patterns and trends in data. However, conventional systems often fall short when it comes to segmenting time series data, particularly with real-time segmentation. Typically, conventional systems store large amounts of time series data and process the data offline long after it has been received. Additionally, even in these cases, due to the complexities and noise of time series segmentation, many conventional systems fail to accurately identify salient patterns in time series data when processed offline. In general, conventional systems are inefficient in their approach to time series segmentation of time series data.

BRIEF DESCRIPTION OF THE DRAWINGS

The detailed description provides one or more implementations with additional specificity and detail through the use of accompanying drawings, as briefly described below. Each of the included figures may be implemented according to one or more implementations included in this disclosure.

DETAILED DESCRIPTION

Figure 1:
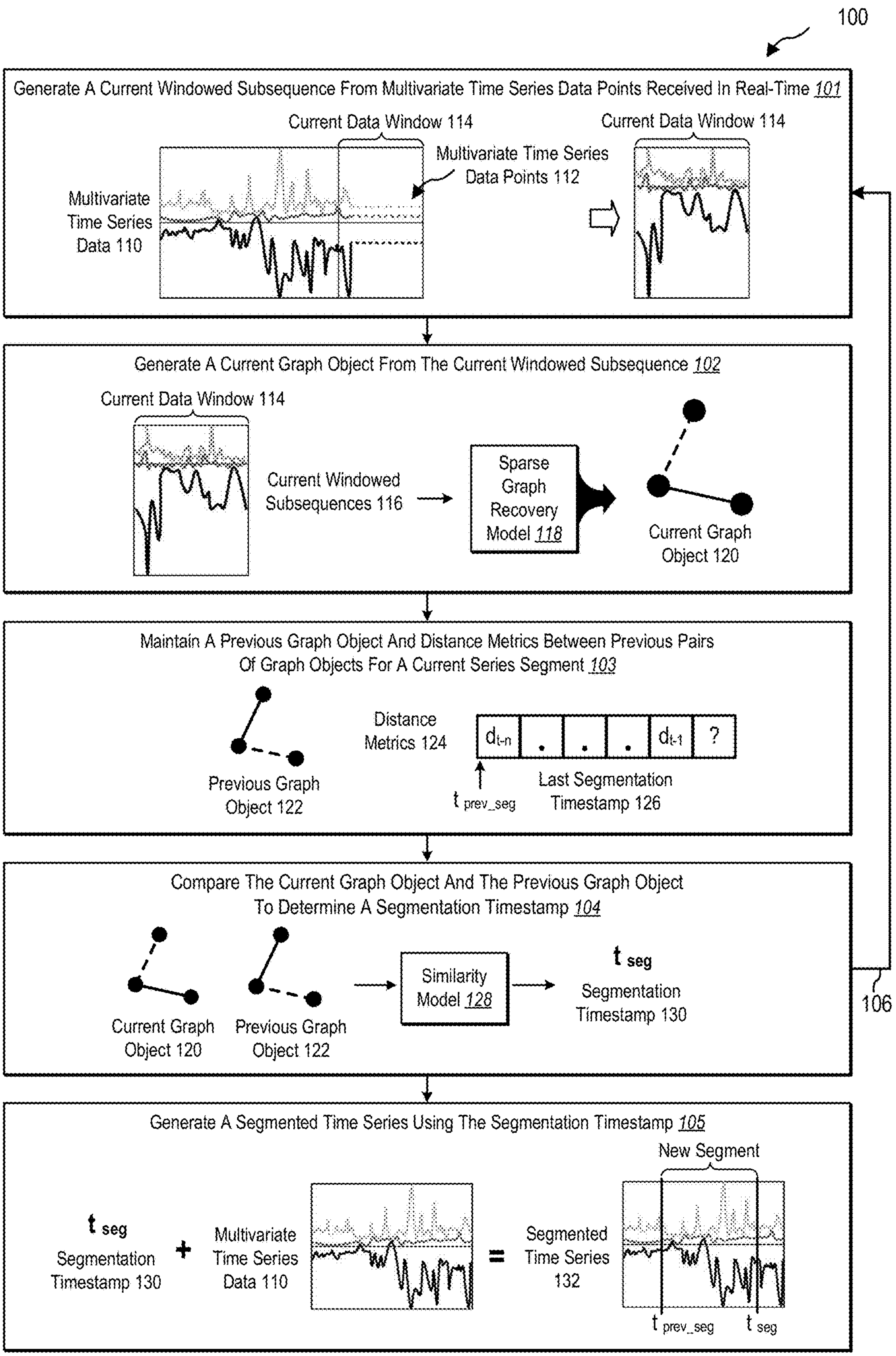
FIG. 1 illustrates an example overview of implementing a real-time segmentation system to segment time series data.

The present disclosure presents a real-time segmentation system that efficiently and accurately segments time series data in real time. For example, the real-time segmentation system is capable of converting both multivariate time series data and univariate time series data into segmented time series data as time series data is received. Additionally, the real-time segmentation system is able to determine time series segmentations on the fly with minimal memory and processing requirements.

To briefly elaborate, the time series segmentation system utilizes various techniques and models to generate a segmented time series efficiently and accurately. It employs time-based data windows to capture incoming multivariate time series data in real time and a graph recovery model to convert recently captured windowed subsequences into graph objects. Furthermore, it uses a similarity model to determine a segmentation timestamp from the graph objects, which is used to convert the time series into a segmented time series.

In many instances, the real-time segmentation system does not need to save the large amounts of data typical of time series data but only retains the current graph object and the previous graph object. In the case of univariate time series data, the real-time segmentation system may also retain a small number of data points to assist in interpolating proxy variable time series. Furthermore, it uses a similarity model to determine segmentation timestamps from the graph objects, which are used to convert the multivariate time series into a segmented multivariate time series.

As indicated above, time series data is commonly used in various industries and areas including healthcare, engineering, manufacturing, scientific research, finance, health tracking, weather, environmental surveys, and physiological studies, among others. For instance, it helps monitor the vital signs of patients and track their health progress, and individuals often use health tracking devices that collect time series data on parameters such as the number of steps, travel distance, elevation changes, oxygen levels, heart rate, move time, and calories expended.

As described in this document, the real-time segmentation system delivers several technical benefits in terms of computing efficiency and accuracy compared to existing systems. Moreover, the real-time segmentation system provides several practical applications that solve problems associated with segmenting time series data, resulting in several benefits.

To elaborate, multivariate time series data is complex and often noisy while univariate time series data can be challenging due to its sparseness. For example, different portions of multivariate time series data may correlate in some instances and not correlate in other instances, making it challenging to extract useful information from such data. As another example, univariate time series data can often include inconsistent information that makes it difficult to determine whether the data is valuable or unintended noise.

In various implementations, the real-time segmentation system generates the same or similar results running in real time as other offline systems, including systems running in batch mode. This is a considerable improvement over conventional systems (e.g., state-of-the-art systems) as most of them are required to simplify approximations when moving to an online version, which greatly sacrifices accuracy. Moreover, the real-time segmentation system accomplishes these results with fewer storage and processing demands.

To elaborate, unlike conventional systems that process the data offline or in batches, which often have a quadratic time complexity based on time series length, the real-time segmentation system efficiently has a linear time complexity, which makes it well-suited for processing large datasets without experiencing significant slowdowns or errors. Further, the real-time segmentation system is able to perform real-time processing with minimal time complexity and space complexity (e.g., computational and memory requirements). In particular, the real-time segmentation system operates with a time complexity of O(1) and a space complexity of O(1) (and O(N) in worst-case scenarios where N is the length of a time series segment).

More particularly, the real-time segmentation system operates with a time complexity of O(1) and a space complexity of O(1) (and O(N) in worst case scenarios, where N is the length of a time series segment) by converting the input time series into a current temporal dependency graph objects sequence using a graph recovery model and comparing each current graph object to a previous graph object using a similarity model. In this way, the real-time segmentation system generates a segmented time series on a linear scale in real time, unlike conventional systems that typically require a quadratic scale. This is a significant improvement and offers practical advantages for efficiently processing large datasets.

Moreover, the real-time segmentation system also accommodates a wide range of data types and sets by using conditional independence (CI) graphs and other types of graph objects. In various implementations, the real-time segmentation system employs a cross-domain and/or domain-agnostic univariate segmentation framework that draws a parallel between the graph nodes and the variables of the time series. Additionally, the combination of flexibility and efficiency in the real-time segmentation system makes it highly scalable on any size of dataset.

In various implementations, the real-time segmentation system converts a univariate time series into a multivariate time series based on supplementing the univariate time series with real-time proxy variables to generate the real-time multivariate time series. In these instances, the real-time segmentation system stores a small number of data points that are used to interpolate one or more proxy variables for the univariate time series. Indeed, unlike conventional systems that store an entire set of time series data, the real-time segmentation system needs to only store a few data points sampled from a recent buffer window of the univariate time series data.

Implementations that utilize proxy variables for a univariate time series to generate a supplemented real-time multivariate time series increase the accuracy over the univariate time series along. For example, by providing multiple data points along a sequence, the proxy variables emphasize and reveal points in the univariate time series that other models would miss.

Additionally, in these implementations that include supplemented real-time time series data, the real-time segmentation system further reduces computing costs by focusing only on connections with the time series data. For example, the similarity model is conditioned only to process graph objects that include the univariate time series when determining similarities as well as tracking patterns and trends. In these instances, the real-time segmentation system can ignore changes in connections between pairs of graph object nodes that do not include the node for the univariate time series.

Additionally, the use of graph objects in the real-time segmentation system provides interpretable functionality, which is critical for many entities analyzing real-world time series data. Unlike many conventional systems that utilize sparse matrices without indicating how variables and values are correlated, the graph objects generated and utilized by the real-time segmentation system offer greater interpretability. This is especially important in indicating relationships between the univariate time series and various proxy variables over time.

This disclosure uses several terms to describe the features and advantages of one or more implementations. For instance, "time series data" refers to a collection or sequence of data points for a single variable or multiple variables recorded at different points in time. The variable can include a wide range of data types, such as numerical, categorical, and text data. For example, "univariate time series data" refers to a sequence of data points for a single variable or recorded at different points in time, and "multivariate time series data" refers to a collection of data points that record multiple variables at different points in time. These variables are measured simultaneously over a period of time and can include a wide range of data types, such as numerical, categorical, and text data.

As used herein, the term "real time," as in real-time time series data, refers to the live processing of events and data as they are generated and/or provided. In various implementations, real time includes near-real time, which accounts for minimal processing constraints. For example, in this disclosure, real-time time series data refers to receiving data points for one or more time series as they are provided and processing the data points with minimal delay. In some instances, real-time processing refers to online or on-the-fly processing as opposed to offline or processing previously stored data.

In addition, the term "segmented time series" refers to a time series that includes indications of segmented portions of the time series within the data. In this document, a segment refers to a consecutive portion of data that corresponds to the same or similar activity or event, which is distinct from just consecutive data within a time window (which is discussed below as a subsequence or windowed time data). A segment can be identified by consistent temporal patterns among the consecutive data points in a time series.

A "subsequence" is a subset or smaller section of a larger sequence. In the context of a time series and/or a supplemented multivariate time series, a subsequence is a local section of the time series that consists of a continuous subset of its values. For example, a subsequence $T_{i,M}$ of a supplemented multivariate time series T is a continuous subset of the values from T of length M starting from position i. For instance, the subsequence $T_{i,M}$ is represented as $T_{i,M}=t_i, t_{i+1}, \ldots, t_{i+M-1}$, where $1 \leq i \leq N-M+1$.

A "windowed subsequence" refers to a subsequence selected from a multivariate time series based on a data window of fixed size and sliding location. The windowed subsequence moves through the time series with a specified step size (e.g., stride length), allowing for a set of overlapping subsequences to be extracted. The type, location, movement pattern, and size of a data window depend on numerous factors, which are provided below. For instance, smaller data window sizes with larger overlaps may capture finer-grained patterns but may result in a larger number of subsequences and higher computational complexity. Conversely, larger data window sizes and smaller overlaps may result in a smaller number of subsequences but may miss finer-grained patterns. A "current windowed subsequence" refers to a windowed subsequence filled with real-time data points (e.g., data points received in real time).

Regarding data windows (i.e., moving or sliding temporal windows), a "stride length" refers to the number of data points that a data window shifts or moves to capture different windowed subsequences. For example, the stride length indicates how much a data window shifts from a current starting position in the multivariate time series to the next starting position between data window captures. To illustrate, a stride length s indicates that if the current subsequence is located at $T_{i,M}$ where i is the starting position of the subsequence from the multivariate time series T with length M, then, the next subsequence is $T_{i+s,M}$ with the starting position at i+s.

A "graph object" or "temporal graph" refers to a visual tool used to represent and/or visualize relationships between concepts in time series data. A graph object may take the form of a graph, chart, or table showing relationships between various variables, features, or concepts. Graph objects can be represented as an adjacency list or adjacency matrix. A graph object includes both positive and negative partial correlations between variables. For instance, a connection, shown as an edge in a graph object or an entry in a matrix, can range in correlation strength from [−1, 1] and different visual effects, such as colors, thicknesses, and patterns can be used to show the magnitudes of connection strength or other correlation scores between variables. A "current graph object" refers to a graph object that includes the latest received real-time data points. A "previous graph object" refers to the graph object generated before the current graph object.

A "timestamp" refers to a unique identifier that represents a specific point in time within a time series. A timestamp includes a data structure that includes information about a specific time in a time series dataset. Similarly, the term "segmentation timestamp" refers to a proposed or actual starting or ending point of a segment within a segmented time series.

As used herein, the term "sparse graph recovery" refers to the process of recovering a graph object from data sources. For example, a sparse graph recovery model recovers graph objects from time series data (e.g., subsequences of time series data) by discovering a probabilistic graphical model that potentially shows sparse connections between D features of an input sample. Sparse graph recovery models range from generic sparse graph recovery models to deep-learning sparse recovery models, such as uGLAD.

The term "conditional independence graph object" (or CI graph object) refers to a graph object that displays or exhibits partial correlations between nodes (or features). For instance, a partial correlation captures a direct dependency between the features (e.g., variables) as it is the conditional probability of the features under consideration given all the other features. In other words, a CI graph object represents dependencies between variables in a time series while considering the dependencies on other variables.

Additionally, the term "conditional similarity model" refers to one or more functions, algorithms, and/or processes for comparing graph objects relative to a time series. In various implementations, a conditional similarity model includes a trajectory tracking algorithm that analyzes how the time series, represented in graph objects, evolves over intervals to determine segmentation information for the time series.

The term "proxy variable time series" (or simply "proxy variables") refers to a time series of data points that complements a time series. In many instances, proxy variables approximate data points, trends, and patterns of a time series. For example, a proxy variable is generated by applying one or more functions to the time series or may be based on functions that are independent of the time series (e.g., $\sin(\theta)$). In some instances, a proxy variable serves as a surrogate variable for a time series.

Proxy variables include various types of time series such as approximations of a time series. Proxy variables may be linear-, quadratic-, polynomial-, or spline-based sequences, for instance. Some examples of proxy variables include a time series interpolated from a time series (e.g., an approximation time series based on linear or non-linear interpolation), regression-based and/or trend approximations of a time series, fixed or polynomial variables that are not based or interpolated from a time series, or statistical function such as mean or average functions. Additional details regarding proxy variables are provided below.

In this document, the term "supplemented multivariate time series" refers to a multivariate time series that includes a time series and at least one proxy variable (i.e., proxy variable time series). A supplemented multivariate time series can include any number of proxy variables that accompany a time series for a duration of time.

As used herein, the term "machine learning" refers to algorithms that generate data-driven predictions or decisions from known input data by modeling high-level abstractions. Examples of machine-learning models include computer representations that are tunable (e.g., trainable) based on inputs to approximate unknown functions. For instance, a machine-learning model includes a model that utilizes algorithms to learn from, and make predictions on, known data by analyzing the known data to learn to generate outputs that reflect patterns and attributes of the known data. For example, machine-learning models include latent Dirichlet allocation (LDA), multi-arm bandit models, linear regression models, logistical regression models, random forest models, support vector machines (SVMs) models, neural networks (convolutional neural networks, recurrent neural networks such as LSTMs, graph neural networks, etc.), or decision tree models.

Additionally, a machine-learning model can include a sparse graph recovery machine-learning model (or simply "model" as used hereafter) that determines correlation strengths between pairs of concepts within sets of digital documents. In some implementations, the sparse graph recovery machine-learning model is a neural network that includes multiple neural network layers. In various implementations, the sparse graph recovery machine-learning model includes a uGLAD model or tGLAD model, which are deep models that solve the graphical lasso objective with improved guarantees in terms of sample complexity and capturing tail distributions.

Additionally, this disclosure describes a real-time segmentation system in the context of a network. In this disclosure, a "network" is defined as one or more data links that enable electronic data transport between computer systems and/or modules and/or other electronic devices. A network may include public networks such as the Internet as well as private networks. When information is transferred or provided over a network or another communications connection (either hardwired, wireless, or a combination of hardwired or wireless) to a computer, the computer properly views the connection as a transmission medium. Transmission media can include a network and/or data links that can be used to carry needed program code means in the form of computer-executable instructions or data structures and which can be accessed by a general-purpose or special-purpose computer. Combinations of the above are also included within the scope of computer-readable media.

Additional details regarding an example implementation of the real-time segmentation system (i.e., "a real-time time series segmentation system") are discussed in connection with the following figures. For example, FIG. 1 illustrates an example overview for implementing a real-time segmentation system to segment time series data in accordance with one or more implementations. As shown, FIG. 1 includes a series of acts 100 that, in many instances, are performed by a real-time segmentation system.

To illustrate, the series of acts 100 includes an act 101 of generating a current windowed subsequence from multivariate time series data points received in real time. For example, the real-time segmentation system identifies multivariate time series data 110, which may be received from one or more data sources. In some instances, the multivariate time series is generated from univariate time series data supplemented with real-time proxy variables, as discussed below.

As shown, the act 101 includes the real-time segmentation system receiving multivariate time series data points 112 from the multivariate time series and filling up a current data window 114. Once full, the real-time segmentation system captures the multivariate time series data points 112 in a current windowed subsequence 116. Additional details regarding generating a current windowed subsequence of multivariate time series received in real time are provided below in connection with FIG. 3.

As shown, the series of acts 100 includes an act 102 of generating a current graph object from the current windowed subsequences. For example, the real-time segmentation system utilizes a sparse graph recovery model 118 to recover a current graph object 120 of from the most recent set of data points of the multivariate time series captured within the current windowed subsequence 116. In this way, the real-time segmentation system generates the current graph object 120 each time it generates a new version of the current windowed subsequence 116 with data points received in real time. Additional details regarding recovering graph objects using a graph recovery model are provided below in connection with FIG. 4.

As depicted, the series of acts 100 includes an act 103 of maintaining a previous graph object and distance metrics between previous pairs of graph objects for a current time series segment. For example, the real-time segmentation system maintains two graph objects including the current graph object 120 and the previous graph object 122, which is the last previous current graph object before a new current graph object was generated with newer received data points. Additional details regarding maintaining a previous graph object while not storing additional graph objects for a time series are provided below in connection with FIG. 4 and FIG. 5.

Additionally, in various instances, the real-time segmentation system stores or maintains distance metrics 124, which indicate distances between a graph object when it was the current graph object and its previous graph object. In these instances, the real-time segmentation system maintains the distance metrics 124 from the last segmentation timestamp 126. In this manner, the real-time segmentation system does not need to store the larger graph objects for every captured windowed subsequence of the multivariate time series but instead stores one or more distance metrics that indicate the difference between each graph object previously determined (and now deleted) for the current time series segment (e.g., since the last segmentation timestamp 126). Additional details regarding maintaining distance metrics for a time series segment are provided below in connection with FIG. 5 and FIG. 6.

FIG. 1 also shows that the series of acts 100 includes an act 104 of comparing the current graph object and the previous graph object to determine a segmentation timestamp. For example, the real-time segmentation system utilizes a similarity model 128 to determine segmentation timestamp 130 by comparing the current graph object 120 with respect to the previous graph object 122. A segmentation timestamp indicates when the data points in a subsequence of the time series change temporal patterns or shapes. In some cases, the similarity model 128 is a conditional similarity model that conditions its results on a univariate time series. Additional details regarding determining a segmentation timestamp using a similarity model are provided below in connection with FIG. 5.

As depicted, the series of acts 100 includes an act 105 of generating a segmented time series using the segmentation timestamp. For example, the real-time segmentation system incorporates or applies the segmentation timestamp 130 to the multivariate time series data 110 to generate a segmented time series 132 that includes indications when a different segment occurs. Additional details regarding generating a segmented time series are provided below in connection with FIG. 6.

As mentioned above, the real-time segmentation system may repeat some or all of the series of acts 100 as additional real-time time series data is received. To illustrate, FIG. 1 includes the series of acts 100 having an act 106 of repeating the acts 101-104. For example, the real-time segmentation system generates current graph objects from real-time data points of multivariate time series data. The real-time segmentation system compares each pair of current graph objects to generate distance metrics. Then, based on the distance metrics from the last time series segment, the real-time segmentation system determines when a segmentation timestamp occurs.

Figure 2A:
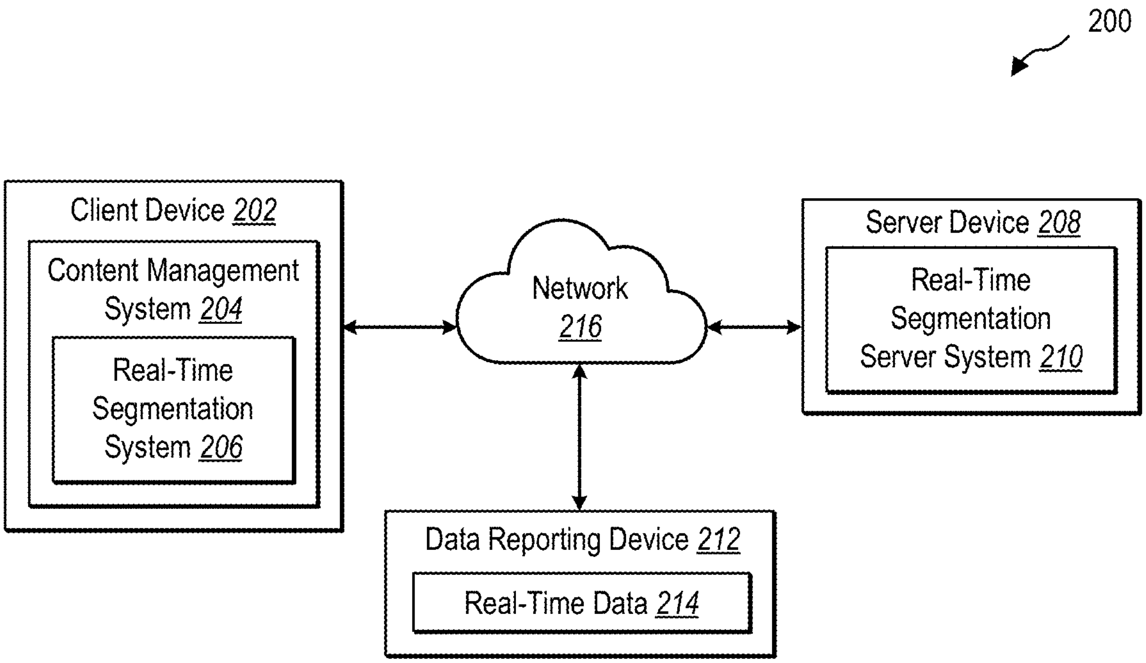
FIGS. 2A-2B illustrate an example system environment where a real-time segmentation system is implemented for segmenting time series data in real time.
Figure 2B:
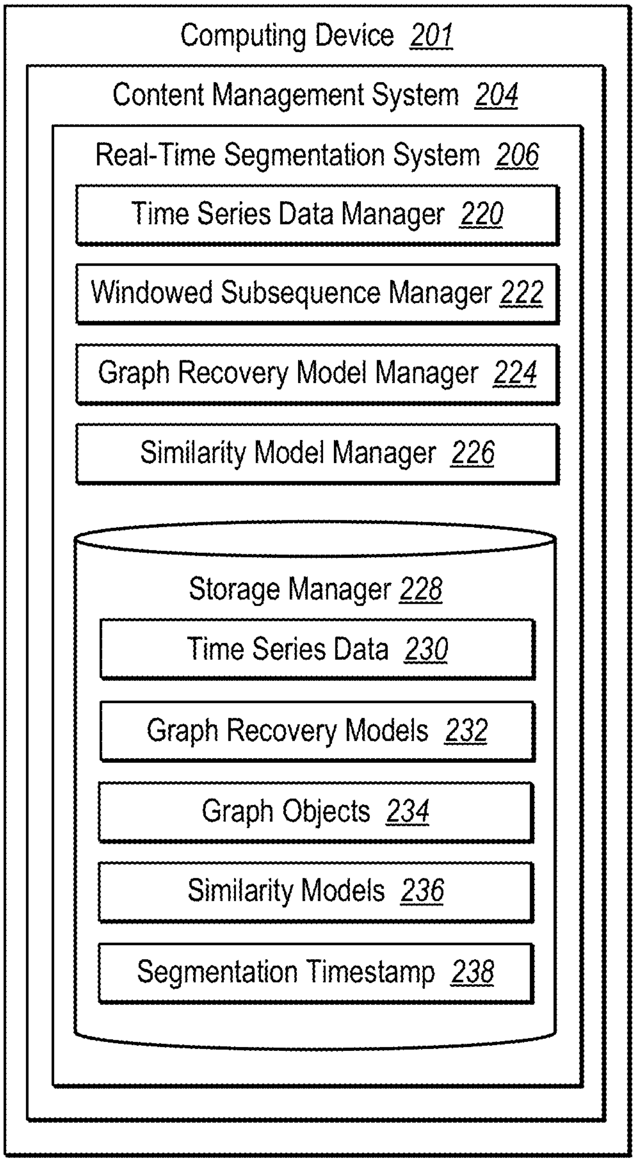

With a general overview of the real-time segmentation system in place, additional details are provided regarding the components and elements of the real-time segmentation system. To illustrate, FIGS. 2A-2B illustrate an example system environment where a real-time segmentation system is implemented in accordance with one or more implementations. While FIGS. 2A-2B show example arrangements and configurations with respect to the real-time segmentation system, other arrangements and configurations are possible.

As shown, FIG. 2A includes an environment 200 of a computing system having a client device 202, a server device 208, and data reporting devices 212, which are connected by a network 216. Further details regarding these and other computing devices are provided below in connection with FIG. 9. In addition, FIG. 9 also provides additional details regarding networks, such as the network 216 shown.

In various implementations, the client device 202 is associated with a user (e.g., a user client device), such as a user who interacts with a real-time segmentation system 206 to request a segmented time series in real time. As shown, the client device 202 includes a content management system 204, which performs a variety of functions. For example, in one or more implementations, the content management system 204 facilitates the receiving, storage, and access of time series data, including time series data.

As shown, the content management system 204 includes a real-time segmentation system 206, which may be located inside or outside of the content management system 204. In various implementations, the real-time segmentation system 206 segments time series in real time based on windowed subsequences, graph recovery models, graph objects, similarity models, and segmentation timestamps. Additional details and components of the real-time segmentation system 206 are provided below in FIG. 2B.

As just mentioned, the content management system 204 may receive and temporarily store time series data for the real-time segmentation system 206 to process. In various implementations, the content management system 204 receives real-time data 214 from data reporting devices 212, which collects, monitors, identifies, tracks, and/or records the real-time data 214 as real-time time series data. In various implementations, the content management system 204 and/or the real-time segmentation system 206 includes the data reporting devices 212 to monitor and collect time-based data.

As shown, the environment 200 also includes the server device 208. The server device 208 includes a real-time segmentation server system 210. For example, in one or more implementations, the real-time segmentation server system 210 represents and/or provides similar functionality as described in connection with the real-time segmentation system 206.

In some implementations, the real-time segmentation server system 210 supports the real-time segmentation system 206 on the client device 202. Indeed, in one or more implementations, the server device 208 includes all or a portion of the real-time segmentation system 206. For instance, the real-time segmentation system 206 on the client device 202 downloads and/or accesses an application from the server device 208 (e.g., one or more deep-learning models) or a portion of a software application.

In some implementations, the real-time segmentation server system 210 includes a web hosting application that allows the client device 202 to interact with content and services hosted on the server device 208. To illustrate, in one or more implementations, the real-time segmentation server system 210 implements the time series segmentation framework, which includes one or more machine-learning models. For example, the client device 202 (e.g., a mobile device) provides a real-time time series to the real-time segmentation server system 210 on the server device 208, which quickly provides back segmentation timestamps and/or a segmented time series to the client device 202.

As mentioned above, FIG. 2B provides additional details regarding the capabilities and components of the real-time segmentation system 206. To illustrate, FIG. 2B shows a computing device 201 that has the content management system 204 and the real-time segmentation system 206. For example, the computing device 201 represents either the client device 202 and/or the server device 208 introduced above.

In addition, as shown, the real-time segmentation system 206 includes various components and elements. For example, the real-time segmentation system 206 includes a time series data manager 220 for accessing, collecting, and displaying time series data as well as managing time series data 230, including multivariate time series data, univariate time series data, and proxy variable time series data. Indeed, in some instances, the time series data manager 220 generates, updates, and manages proxy variables (i.e., proxy variable time series) and supplements a univariate time series with the proxy variables to generate a multivariate time series. In these instances, the time series data manager 220 may store a small number of sample points from a univariate time series within the time series data 230 for generating one or more corresponding proxy variables.

Further, the real-time segmentation system 206 also includes a windowed subsequence manager 222 for generating windowed subsequences from time series data. For example, the windowed subsequence manager 222 generates a current windowed subsequence with real-time multivariate time series data as new data points are received or identified. In various implementations, the windowed subsequence manager 222 stores the current windowed subsequence as part of the time series data 230 while removing or deleting previously received time series data.

Moreover, the real-time segmentation system 206 includes a graph recovery model manager 224, which utilizes graph recovery models 232 to generate graph objects 234 from the time series data 230. Additionally, the real-time segmentation system 206 includes a conditional similarity model manager 226 that utilizes one or more conditional similarity models 236 (and/or stored distance metrics) to determine segmentation timestamps 238. Further, the real-time segmentation system 206 includes a storage manager 228, which stores various pieces of data and/or models, as shown along with additional data not included in FIG. 2B.

Figure 4:
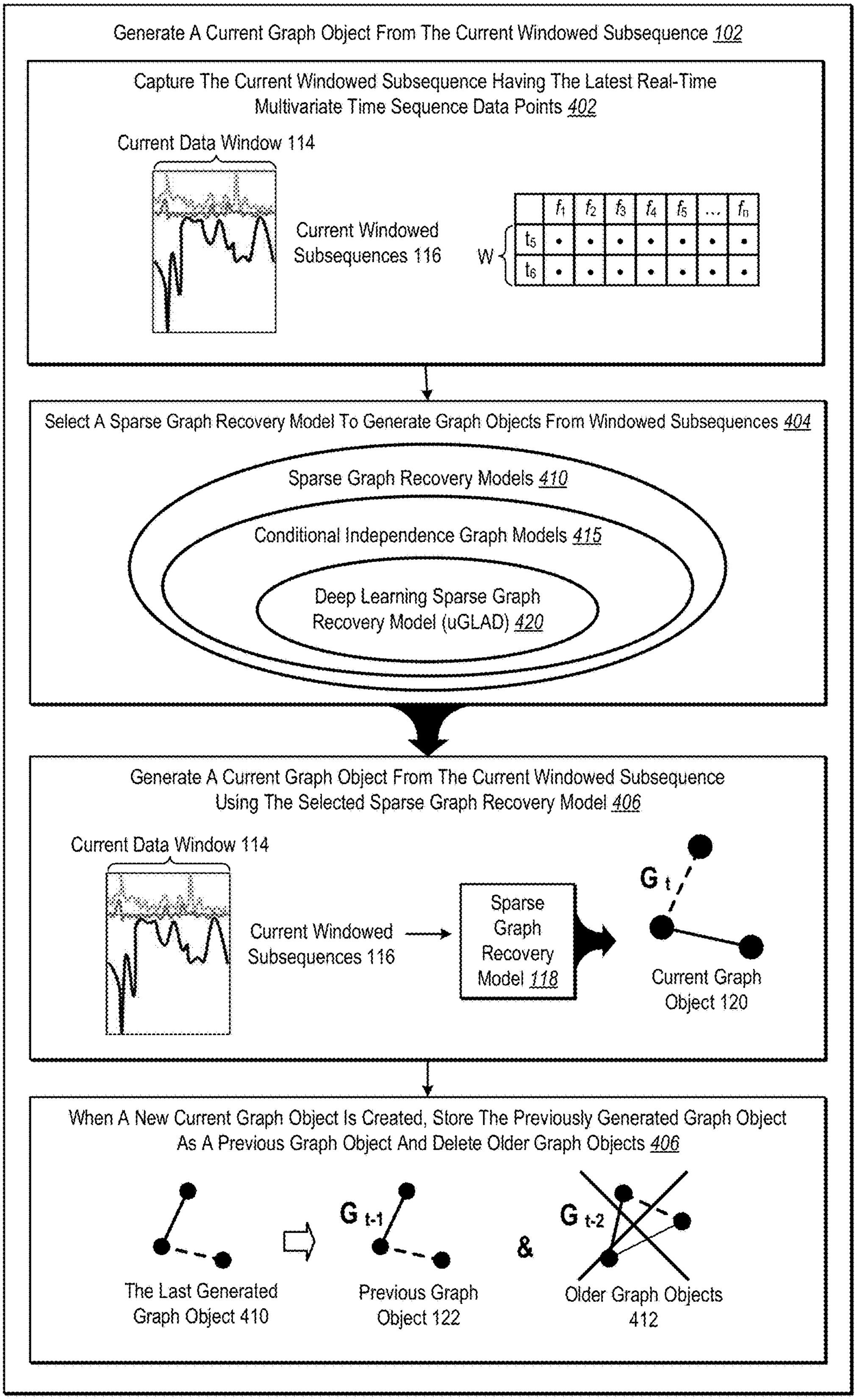
FIG. 4 illustrates an example process for generating a current graph object from the current windowed subsequence using a graph recovery model.
Figure 5:
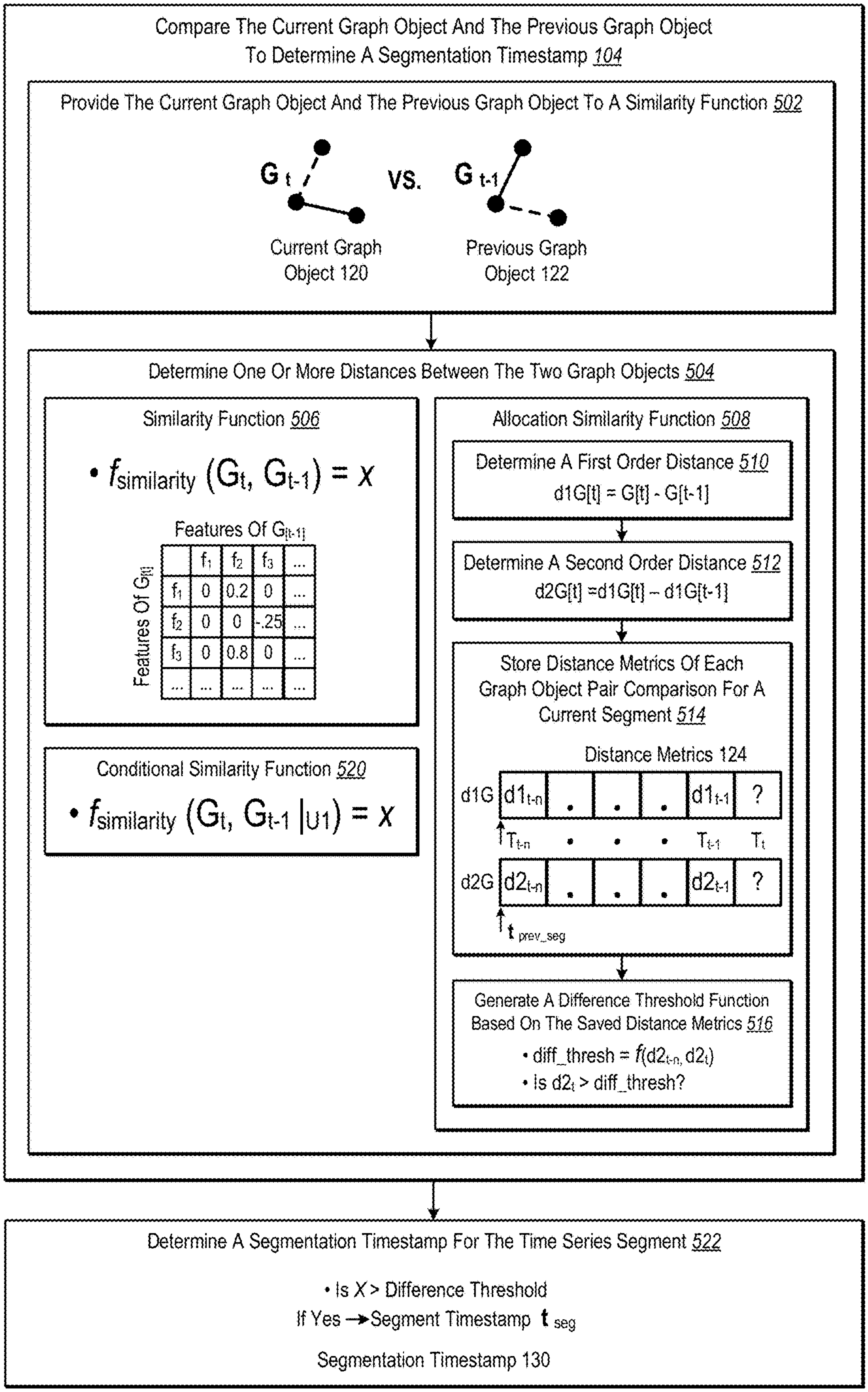
FIG. 5 illustrates an example process for determining a segmentation timestamp using a similarity model.
Figure 6:
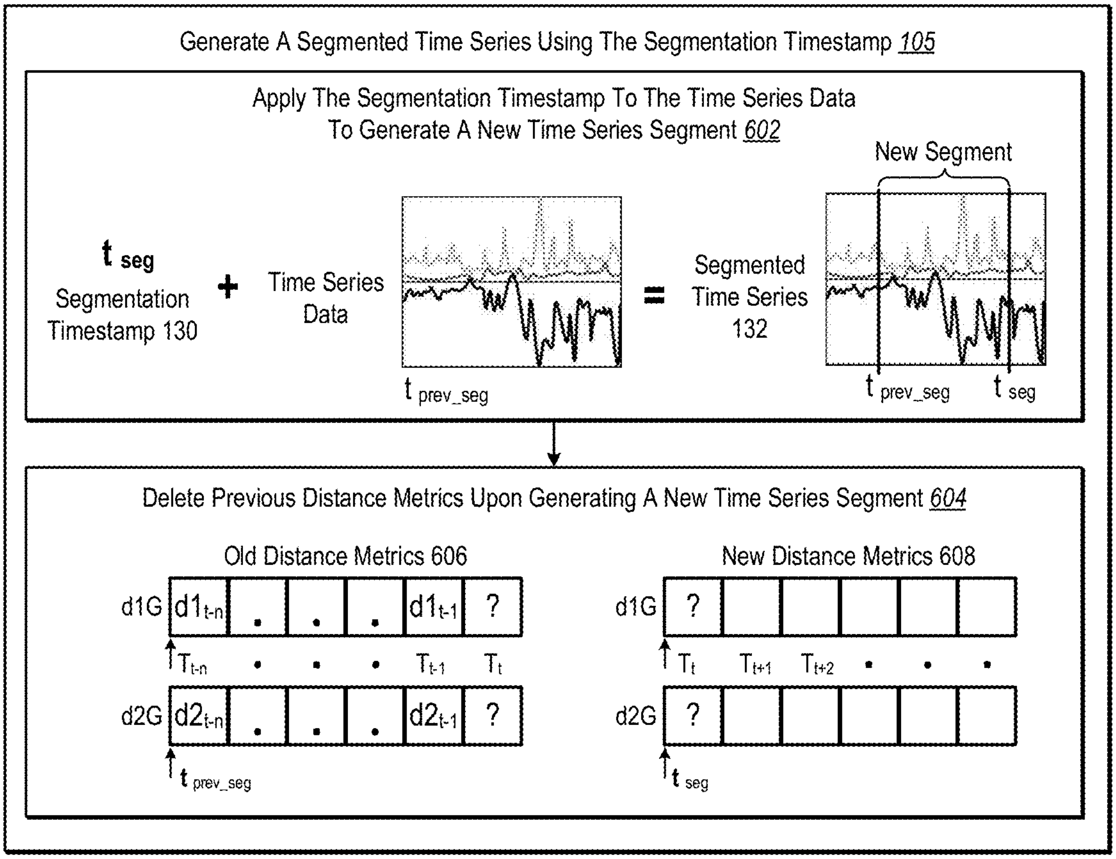
FIG. 6 illustrates an example process for generating a segmented time series using the segmentation timestamp.

With the foundation of the real-time segmentation system 206 in place, additional details regarding various functions of the real-time segmentation system 206 will now be described. As noted above, FIGS. 3-6 provide additional details regarding the acts 101-105 described above. For example, FIG. 3 relates to generating a current windowed subsequence of multivariate time series received in real time. FIG. 4 relates to recovering graph objects using a graph recovery model. FIG. 5 relates to determining a segmentation timestamp using a similarity model. FIG. 6 relates to generating a segmented time series using the segmentation timestamp.

Figure 3:
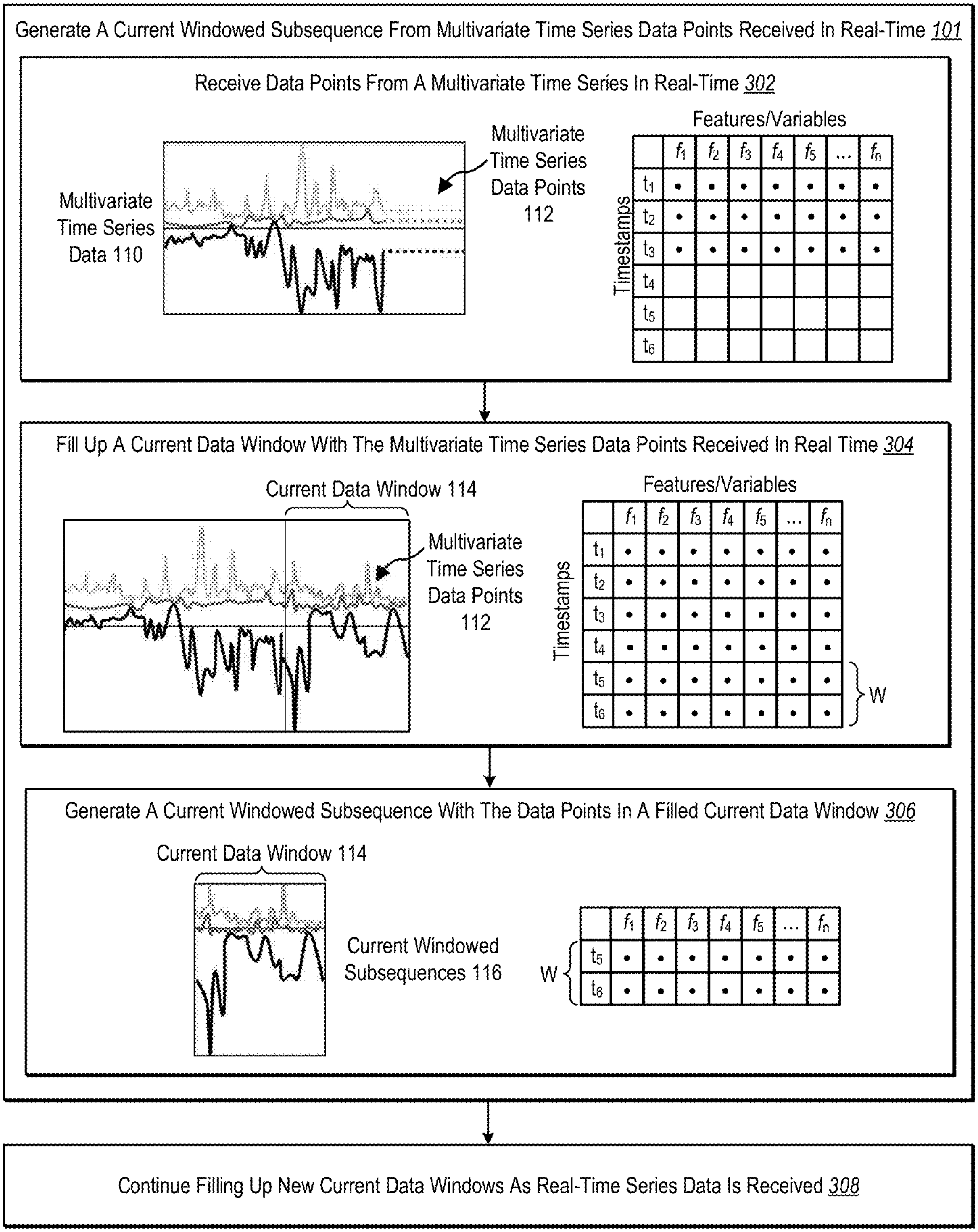
FIG. 3 illustrates an example process for generating a current windowed subsequence from real-time multivariate time series data.

As just mentioned, FIG. 3 illustrates an example process for generating a current windowed subsequence from real-time multivariate time series data in accordance with one or more implementations. As shown, FIG. 3 includes the act 101 of generating a current windowed subsequence from multivariate time series data points received in real time.

As illustrated in FIG. 3, the act 101 includes a sub-act 302 of receiving data points from a multivariate time series in real time. For example, the real-time segmentation system 206 receives a stream of data points for multiple time series. In some instances, the multivariate time series data points 112 are from a multivariate time series. In other instances, the multivariate time series data points 112 are from a univariate time series that is supplemented in real time with real-time proxy variables to become a multivariate time series.

As shown, the multivariate time series data 110 may be represented visually as a graph. Additionally, the multivariate time series data may be represented in a table or matrix form. For example, the multivariate time series data is stored in a precision matrix that plots values of data points of features/variables over time (i.e., recorded at predetermined timestamps). While FIG. 3 shows dots, each entry in the matrix of multivariate time series data 110 can include a value of a data point.

As also shown, the act 101 includes the sub-act 304 of filling up a current data window with the multivariate time series data points 112 received in real time. For instance, the real-time segmentation system 206 maintains a bin or bucket that collects data points as they are detected or received. In these instances, the size of the bin is based on the size of a current data window 114 (e.g., the current data window 114 is a bin or bucket), which may be based on a time duration or a number of data points.

In various implementations, the size of the current data window 114 may remain small to ensure rapid and near-real-time processing of the multivariate time series data. For example, the current data window 114 is 1-3 seconds where multiple data points are received per second. In some implementations, the current data window 114 is larger. Indeed, the size of the current data window 114 commonly depends on the type of time series data being received and its time-sensitivity requirements (e.g., life-support systems are more critical than weather prediction systems).

The current data window 114 may facilitate one or more windowing operations and be defined by window type, window size, stride length, and starting/ending points. For example, the current data window 114 can be one of many window types, such as a tumbling window or a hopping window, as discussed next.

A tumbling window segments data points into distinct, consecutive time segments that do not repeat or overlap and where a data point cannot belong to more than one window (e.g., $W_1$ is from 1-5 seconds, $W_2$ is from 6-10 seconds, $W_3$ is from 11-15 seconds, etc.). In various implementations, the location of each hop is determined based on stride length. A tumbling window moves or jumps forward in a time series the same distance (e.g., stride length) as the window size of the tumbling window.

A hopping window hops forward in time by a fixed period. Hopping windows may overlap, and data points may belong to multiple windowed subsequences (e.g., $W_1$ is from 1-5 seconds, $W_2$ is from 3-7 seconds, $W_3$ is from 7-10 seconds, etc.). A hopping window has a shorter stride length than the window size. In some instances, a hopping window is referred to as a running or moving window.

As shown, the act 101 includes the sub-act 306 of generating a current windowed subsequence with the data points in a filled current data window. In this manner, the real-time segmentation system 206 may process the data points in the current data window 114 upon the window filling, which is discussed in the next figure.

In general, the time series segmentation system uses a fixed window size for one instance through a multivariate time series. For example, each instance of the current windowed subsequence is the same length (e.g., same time duration), which often results in the same number of data points. In some implementations, the real-time segmentation system 206 uses variable window sizes depending on the number, type, or quality of data points included in a particular portion of the multivariate time series.

In one or more implementations, the real-time segmentation system 206 selects the window size based on one or more approaches. For example, the window size is selected based on the type of data being collected and analyzed. In various implementations, the window size is based on the number of data points rather than the time duration, as mentioned earlier.

FIG. 3 also shows an act 308 of continuing to fill up new current data windows as real-time time series data is received. In various implementations, the multivariate time series data points 112 collected in the current data window 114 represent the data points received since the last or previous current data window was filled. Then, as data points are received, the real-time segmentation system 206 continuously fills up the current data window until it is full, which becomes the previous data window or the previous instance of a current data window. The real-time segmentation system 206 then begins filling a new current data window.

As mentioned above, FIG. 4 relates to recovering graph objects using a graph recovery model. In particular, FIG. 4 illustrates an example process for generating a current graph object from the current windowed subsequence using a graph recovery model in accordance with one or more implementations. As shown, FIG. 4 expands on the act 102 of generating a current graph object from the current windowed subsequence.

As illustrated, the act 102 includes a sub-act 402 of capturing the current windowed subsequence 116 having the latest real-time multivariate time series data points. As discussed above, when the current data window 114 fills with data (or a time period elapses), the real-time segmentation system 206 processes the real-time data points.

In addition, the act 102 includes a sub-act 404 of selecting a sparse graph recovery model to generate graph objects from windowed subsequences. As mentioned above, graph recovery models generate or recover graph objects that show potential connections between features or variables within windowed subsequences. Graph recovery models are often algorithm-based and may employ various computer-implemented methods to recover graph objects. For instance, graph recovery models use methods including regression-based, partial correlation, graphical lasso, Markov network, and/or other types of neural machine learning. For example, the graphical lasso methods include optimization, deep unfolding, and/or tensor-based methods. More particularly, the uGLAD and tGLAD models referred to in this document may utilize an unsupervised deep-unfolding graphical lasso-based approach to recover conditional independence graphs.

As shown, the real-time segmentation system 206 may select the sparse graph recovery model from a variety of deep-learning sparse graph recovery models 420. As also shown, the deep-learning sparse graph recovery models 420 can include different levels. For example, at a high level, the deep-learning sparse graph recovery models 420 convert windowed subsequences into graph objects based on sparse data. In some instances, however, these graph objects may not strongly indicate correlations between features.

The next level shown includes conditional independence graph models 415. The conditional independence graph models 415 recover graph objects that include direct dependencies between features by leveraging the concept of conditional independence (CI). The CI property asserts that two variables are independent of each other given a third variable. As the inner level shows, the sparse graph recovery models include deep-learning sparse graph recovery models 420, such as the uGLAD model and the tGLAD model.

In various implementations, the conditional independence graph models 415 and the deep-learning sparse graph recovery models 420 include neural networks that enable adaptive choices of hyperparameters, which in turn improves their efficiency and accuracy in generating graph objects. The deep-learning sparse graph recovery models 420 generate CI graph objects as well as provide increased efficiency and accuracy in generating graph objects, as also discussed below.

To elaborate, CI graph objects capture and/or exhibit partial correlations between the features that model direct dependencies between them. Further, the nodes in a CI graph object represent features that are connected by edges having edge weights that include partial correlation values (e.g., ranging from [−1, 1]) signaling positive or negative partial correlation information between nodes (positive connections are shown with a solid line and negative connects are shown as dashed lines). The real-time segmentation system 206 uses edge weights and/or partial correlation values to determine segmentation predictions. Additionally, the partial correlation values enable graph objects to provide understanding and transparency to users by being displayed visually.

As mentioned above, in various implementations, the real-time segmentation system 206 utilizes the deep-learning sparse graph recovery models 420. Examples of deep-learning sparse graph recovery models include uGLAD and tGLAD, which employ deep-unfolding (or unrolled) algorithms and are an unsupervised extension of a similar GLAD model. These types of deep-learning sparse graph recovery models 420 solve the graphical lasso (i.e., least absolute shrinkage and selection operator) problem through optimization.

In various instances, the deep-learning sparse graph recovery models 420 utilize a tensor-based implementation that allows for multitask learning and enables a single model (e.g., a single run or a single model) to recover the entire batch of data simultaneously (e.g., batch mode or batch processing). Indeed, the deep-learning sparse graph recovery models 420 are sparse graph recovery machine-learning models that robustly handle missing values by leveraging the multi-task learning ability of the model.

Upon selecting a sparse graph recovery model, the real-time segmentation system 206 recovers a graph object for the current data window 114. To illustrate, the act 102 includes a sub-act 406 of generating a current graph object 120 from the current windowed subsequence 116 using the selected version of the sparse graph recovery model 118. For example, the real-time segmentation system 206 provides the data points from the current data window 114 to the sparse graph recovery model 118 to convert the data points into a current graph object 120 (i.e., $G_t$).

To elaborate, in various implementations, the current windowed subsequence 116 may be represented as input X. In these cases, the real-time segmentation system 206 utilizes the sparse graph recovery model 118 to run on the input (i.e., X) and outputs a corresponding temporal graph. In various implementations, the real-time segmentation system 206 utilizes the conditional independence graph models 415 and/or the deep-learning sparse graph recovery models 420 to ensure the model runs efficiently and that the current graph object 120 captures direct dependencies between the features (e.g., nodes).

As shown, the current graph object 120 includes nodes representing the features and edges that show direct positive correlations or negative partial correlations (e.g., solid lines shown for positive correlations and dashed lines shown for negative correlations) between the features. In some instances, a graph object is represented as G. For instance, the current graph object 120 is shown as $G_t$, or a graph object at the current time t.

The act 103 also includes a sub-act 406 of storing the previously generated graph object as a previous graph object when a new current graph object is created and deleting older graph objects. As shown, when a new version of the current graph object 120 is generated, in various implementations, the real-time segmentation system 206 converts the last generated graph object 410 into the previous graph object (i.e., $G_{t-1}$). In this way, the real-time segmentation system 206 maintains the current graph object 120 and the previous graph object 122.

Additionally, the real-time segmentation system 206 deletes, removes, or archives older graph objects 412. For example, the real-time segmentation system 206 removes the previous instance of the previous graph object once a new version of the previous graph object 122 is created. In this manner, rather than storing all of the graph objects from a multivariate time series or from a segment of the multivariate time series, the real-time segmentation system 206 stores only the two most recent graph objects for the real-time multivariate time series data, which requires significantly less memory.

As described above, FIG. 5 relates to determining a segmentation timestamp. In particular, FIG. 5 illustrates an example process for determining a segmentation timestamp using a similarity model in accordance with one or more implementations. As shown, FIG. 5 expands on the act 104 of comparing the current graph object and the previous graph object to determine a segmentation timestamp.

As shown, the act 104 includes the sub-act 502 of providing the current graph object 120 and the previous graph object 122 to a similarity function. For example, when a new version of the current graph object 120 is created, the real-time segmentation system 206 provides the current graph object 120 and the previous current graph object (i.e., the previous graph object 122) to a similarity model that utilizes one or more similarity functions to determine whether a segmentation timestamp exists for the current time series segment being received and processed.

Conceptually, the similarity model compares two or more of the graph objects to identify when a meaningful change occurs between their corresponding correlations. Often the similarity model compares consecutive graph objects (or graph object distance metrics). When a change is detected, in some instances, the real-time segmentation system 206 sets the time of one of the graph objects (e.g., the end of a first graph object or the start of a second graph object) as a segmentation timestamp.

As also shown, the act 104 includes the sub-act 504 of determining one or more distances between two graph objects. In various implementations, the similarity model 128 includes different functions, algorithms, and models to determine the segmentation timestamp 130. Among those shown, the similarity model 128 includes a similarity function 506, an allocation similarity function 508, and a conditional similarity function 520.

In various implementations, the similarity function 506 generates an adjacency matrix and uses it to determine an $F_{similarity}$ score. To illustrate, consider two graph objects, the current graph object 120 (i.e., $G_t$) and the previous graph object 122 (i.e., $G_{t-1}$). The real-time segmentation system 206 utilizes the similarity function 506 to determine an adjacency matrix, X, between $G_t$ and $G_{t-1}$. As shown, FIG. 5 includes an example adjacency matrix in connection with the similarity function 506.

In various implementations, the adjacency matrix determines the difference in values between each feature connection. In some implementations, the adjacency matrix indicates the changes, if any, between the feature connections of the current graph object 120 (i.e., $G_t$) and the previous graph object 122 (i.e., $G_{t-1}$).

Additionally, in various implementations, the similarity function 506 determines if the differences between two graph objects satisfy a difference threshold. To elaborate, in some implementations, the real-time segmentation system 206 combines one or more of the scores from an adjacency matrix to determine if the combined value satisfies a difference threshold. For example, the real-time segmentation system 206 sums up the absolute value of each entry in an adjacency matrix to determine if the combined sum of the absolute distance values is greater than or equal to the difference threshold. In various implementations, the real-time segmentation system 206 determines if any one entry satisfies the same or a different difference threshold (e.g., there must be a significant change between at least one feature pair between the two graph objects).

If the difference threshold is satisfied, then the real-time segmentation system 206 uses the similarity function 506 to identify a segmentation timestamp. For example, when two compared graph objects are found to have a significant difference, the real-time segmentation system 206 knows at least four timestamps: the start of the first graph object, the end of the first graph object, the start of the second graph object, and the end of the second graph object. Accordingly, the real-time segmentation system 206 may select one of these times within this range as a segmentation timestamp.

In some implementations, the real-time segmentation system 206 selects a segmentation timestamp between two of the timestamps.

In various instances, the real-time segmentation system 206 uses different methods for selecting a segmented timestamp based on the window type. For example, for a tumbling window where windowed subsequences do not overlap, the end of the first graph object and the start of the second graph object are the same timestamp for consecutive windows. If the windows are not consecutive, the real-time segmentation system 206 may select a timestamp between the two windows for the segmentation timestamps. For a hopping window, the data points overlap, and the real-time segmentation system 206 may average between the start of the first graph object and the start of the second graph object as the segmentation timestamp.

In some implementations, the real-time segmentation system 206 utilizes an allocation similarity function 508 for the similarity model. In general, the allocation similarity function 508 uses a multi-step framework to identify segmentation timestamps. For example, the allocation similarity function 508 determines a first-order distance of multiple graph objects and determines a second-order distance by taking the absolute value of the first-order distance. In various implementations, the first-order distance measures the change between each recovered graph and its next neighbor, while the second-order distance highlights potential segmentation points.

To elaborate, as shown, the real-time segmentation system 206 includes an act 510 of determining a first-order distance. In various instances, the real-time segmentation system 206 utilizes the first-order distance to convert graph objects having data points from the time-series domain to a comparison domain. For example, the real-time segmentation system 206 determines the first-order distance, $d1G\in\mathbb{R}^B$, by finding the distance of consecutive graphs (e.g., the current graph object 120 and the previous graph object 122). For each entry, b∈B of d1G, the real-time segmentation system 206 measures the distance between a current graph object and a previous graph object, where weights are the partial correlation values of the edges of the CI graph objects.

$$d1G[b] = \text{distance}(G_b, G_{b+1}) = \sum_{p,q}(G_b[p, q])\forall\, p, q \in \{1, \ldots, B\}$$

Further, given the sequence d1G, the real-time segmentation system 206 computes the second-order distance sequence. To illustrate, the allocation similarity function 508 includes an act 512 of determining a second-order distance (e.g., an absolute distance value). In various instances, the real-time segmentation system 206 determines the second-order distance, d2G, between the current graph object 120 and the previous graph object 122 by applying a second distance operation, such as the formulation shown below.

$$d2G[b] = \text{abs}(dG[b] - dG[b-1]),\ \forall\, b \in (1, B)$$

In various instances, the real-time segmentation system 206 then utilizes the allocation similarity function 508 to determine the final segmentation points from the d2G sequence. For example, in some instances, the real-time segmentation system 206 filters out small noises in d2G by applying a noise threshold, which is conservative in many instances.

As shown, the allocation similarity function 508 includes an act 514 of storing distance metrics of each graph object pair comparison for a current segment. For example, while the real-time segmentation system 206 generally maintains the two latest instances of graph objects, in various instances, the real-time segmentation system 206 may store distance metrics 124 between each current/previous graph object pair comparison for a current segment. In these instances, the distance metrics 124 require significantly less memory and storage space than storing the larger graph objects. For instance, in these implementations, the time complexity is O(1) and the space complexity ranges between O(1) and O(B), where B is the number of distance metrics stored in the buffer or windowed subsequence. While B primarily represents a portion or subset of a time series, in some occasional instances, B includes the length of the observed time series if a segmentation has not yet occurred.

To illustrate, in some instances, the real-time segmentation system 206 stores the first order, d1G, distance metrics in a first data array that includes distance metrics (e.g., a value representing the difference between the two compared graph objects) beginning from when the last time segment was determined (e.g., $t_{prev\_seg}$ or the previous segmentation timestamp). Similarly, in various implementations, the real-time segmentation system 206 stores the second order, d2G, distance metrics in a second data array.

As shown, the allocation similarity function 508 includes an act 516 of generating a difference threshold function based on the saved distance metrics. For example, the real-time segmentation system 206 utilizes the distance metrics 124 of the second order in the second data array to determine a difference threshold for determining when a segmentation timestamp occurs (e.g., the difference threshold is a function of the stored distance metrics). In this way, the real-time segmentation system 206 evaluates patterns of distance metrics since the last time series segment to determine when newly detected changes represent a new time series segment or rather an anomaly in the data. Indeed, by using and tracking the distance metrics from the beginning of the time series segment, the real-time segmentation system 206 may better account for noise and other anomalies that occur in the data.

In some instances, the real-time segmentation system 206 also considers the type of data along with the real-time segmentation system stores distance metrics when determining the difference threshold. For example, based on the data type, the real-time segmentation system 206 allows for different distance magnitudes (e.g., relative changes) between entries in the array of stored data. Further, in various implementations, the real-time segmentation system 206 can dynamically learn a difference threshold for each array portion. Indeed, by determining a difference threshold as a function of the stored data, the real-time segmentation system 206 provides a more accurate and flexible difference threshold that reduces the likelihood of selecting an incorrect segmentation timestamp.

In some implementations, rather than generating a difference threshold from a difference threshold function, the real-time segmentation system 206 utilizes a default threshold. In these implementations, the real-time segmentation system 206 need only store the latest distance metric between the currently compared version of the current graph object 120 and the previous graph object 122. In these implementations, the time complexity is O(1) and the space complexity is also O(1).

In various implementations, the real-time segmentation system 206 utilizes a conditional similarity function 520 for the similarity model. For example, the sparse graph recovery model is conditioned on a particular time series. To elaborate, a conditional similarity function 520 focuses on graph object correlations (e.g., edges) that directly connect to a particular graph node representing a particular time series while ignoring offer correlations.

To elaborate, the sparse graph recovery model ignores graph object connections between the different proxy variables not directly connected to the time series. For example, when the multivariate time series is generated from a univariate time series (as further detailed in connection with FIGS. 7A-7B), the real-time segmentation system 206 utilizes a conditional similarity function 520 to determine conditional distance metrics with respect to the univariate time series while ignoring connections between two real-time proxy variables. Further, by conditioning the similarity model based on a particular time series, the real-time segmentation system 206 reduces the number of calculations the conditional similarity function 520 needs to make by ignoring artificial time series graph object connections.

As shown, FIG. 5 includes an act 522 of determining a segmentation timestamp 130 for the time series segment. For example, in various implementations, the real-time segmentation system 206 traverses the first-order and/or second-order distance metrics to determine when a distance metric satisfies the difference threshold. For example, the real-time segmentation system 206 determines that the current distance metric between the current graph object 120 and the previous graph object 122 meets or exceeds the difference threshold determined from a difference threshold function. When the difference threshold is satisfied, the real-time segmentation system 206 determines a segmentation timestamp 130, as provided above.

In some implementations, the real-time segmentation system 206 disregards changes representing potential segmentation points when the change occurs within a predetermined time frame and/or if the changes occur less than a threshold number of times (e.g., 5 times) within the window size.

In various implementations, the real-time segmentation system 206 coordinates the similarity model with the sparse graph recovery model, discussed above, to determine how to process the current graph object 120 to generate segmentation timestamp 130. For instance, if the sparse graph recovery model generates conditionally independence graph objects, the similarity model applies different methods to determine the segmentation timestamp 130 than if the sparse graph recovery model did not generate CI graph objects.

As mentioned above, FIG. 6 relates to generating a segmented time series. In particular, FIG. 6 illustrates an example process for generating a segmented time series using the segmentation timestamp in accordance with one or more implementations. As shown, FIG. 6 elaborates on the act 105 of generating a segmented time series using the segmentation timestamp.

As illustrated, the act 105 includes a sub-act 602 of applying the segmented timestamp to the time series data to generate a new time series segment. In various implementations, the real-time segmentation system 206 adds, overlays, incorporates, and/or otherwise applies the segmentation timestamp 130 to the time series data to generate the segmented time series 132. For example, the real-time segmentation system 206 applies the segmentation timestamp 130 to the time series to identify the end of a current time series segment and/or the beginning of a new time series segment.

In some implementations, the real-time segmentation system 206 generates a multivariate time series segment by segmenting a multivariate time series using the segmentation timestamp 130. In alternative implementations, the real-time segmentation system 206 generates a univariate time series segment by segmenting a univariate time series with the segmentation timestamp 130. In these implementations, the real-time segmentation system 206 applies the segmentation timestamp 130 to the original univariate time series and/or removes the proxy variables from the supplemented time series.

As shown, the act 105 also includes a sub-act 604 of deleting previous distance metrics upon generating a new time series segment. For example, the real-time segmentation system 206 deletes, removes, or clears the old distance metrics 606 corresponding to the recently created time series segment. Indeed, once a time series segment is generated, the real-time segmentation system 206 can replace and/or overwrite the old distance metrics 606 with new distance metrics 608 corresponding to the next time series segment for additionally received real-time time series data.

By clearing out the array of distance metrics and/or beginning again each time a new time series segment is determined, the real-time segmentation system 206 needs only store a small number of distance metrics. Indeed, because the real-time segmentation system 206 does not need to store or process a lot of data, it is more suitable for processing real-time data processing and segmentation.

In one implementation, the real-time segmentation system 206 could also perform an offline process to independently determine time series segments for the same multivariate time series data. Then, using the segmentation timestamps resulting from the offline processing, the real-time segmentation system 206 can adjust various factors, such as the current data window (e.g., add/remove additional data points) and/or to distance threshold function to improve and/or verify the real-time time series segment process.

Figure 7A:
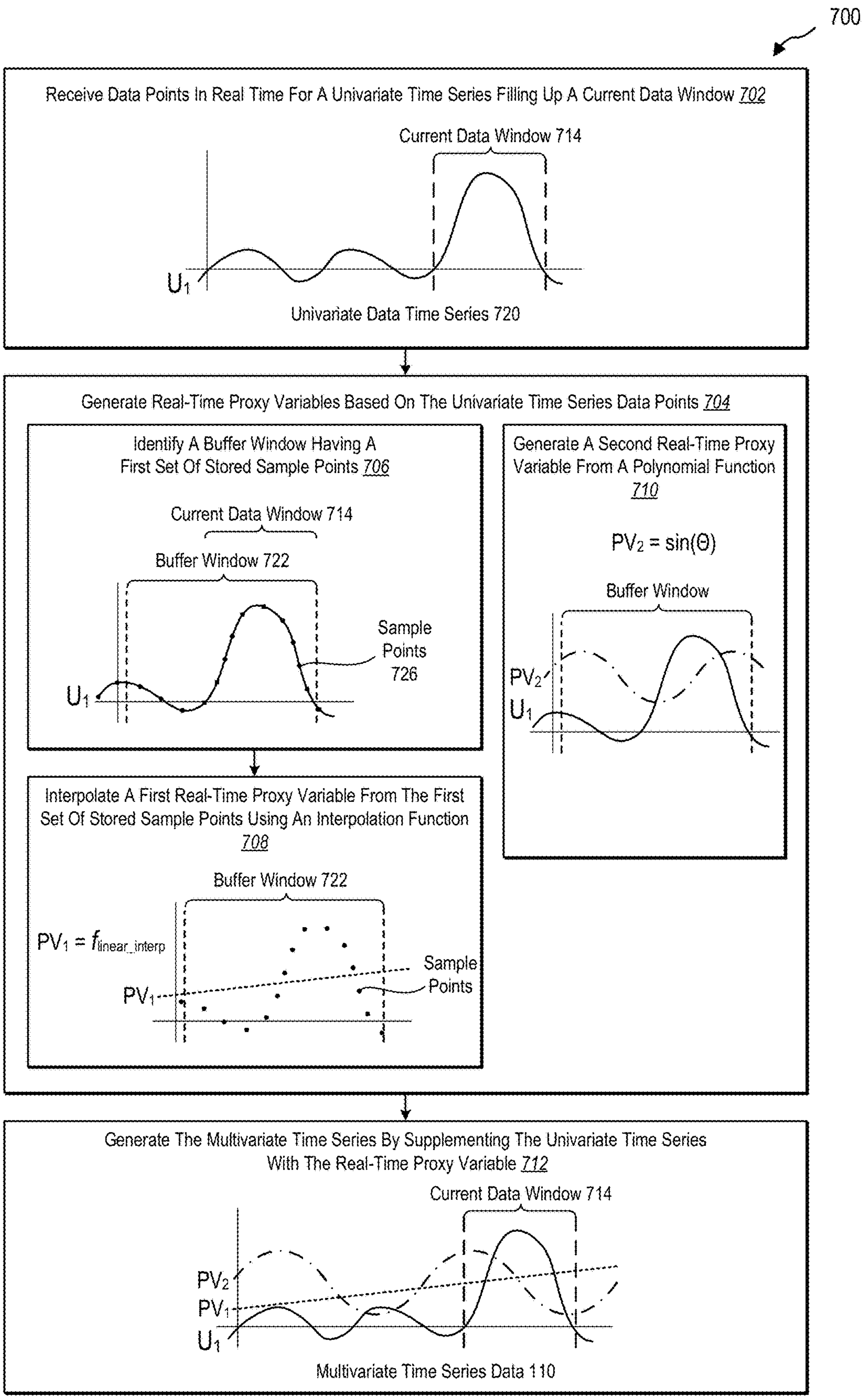
FIGS. 7A-7B illustrate example process flows for generating real-time multivariate time series data from univariate time series data.
Figure 7B:
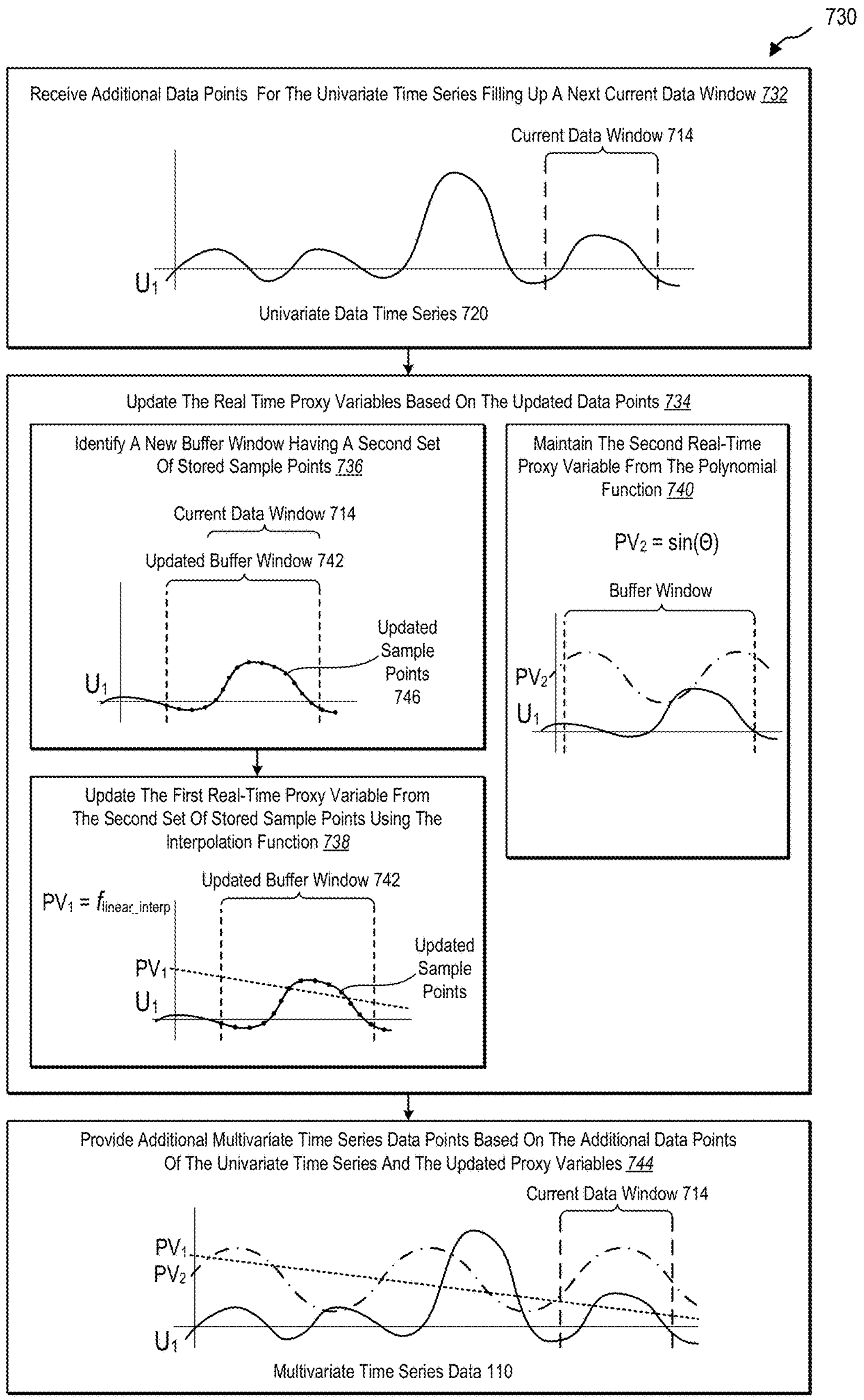

As mentioned above, the real-time segmentation system 206 determines time series segments in real time for both multivariate time series data and univariate time series data. For a univariate time series, the real-time segmentation system 206 may perform an additional step to supplement the univariate time series with real-time proxy variables to generate real-time multivariate time series. FIGS. 7A-7B provide more details about supplementing a univariate time series into a multivariate time series.

As shown, FIGS. 7A-7B illustrate example process flows for generating real-time multivariate time series data from univariate time series data. In particular, FIG. 7A includes a first series of acts 700 for generating a multivariate time series from a univariate time series. Additionally, FIG. 7B includes a second series of acts 730 that is a continuation of the first series of acts 700.

As shown, the first series of acts 700 includes an act 702 of receiving data points in real time for a univariate time series filling up a current data window 714. For example, the real-time segmentation system 206 receives data points from a univariate time series 720 (e.g., a time series with data point values for a single variable). As similarly described above, the act 702 may include receiving data points in real time for the univariate time series to fill up the current data window 714.

In various implementations, univariate time series data can be sparse, making it difficult to detect time series segments. For example, a univariate time series may include a spike in the data that may correspond to a new time series segment or may be caused by noise. Accordingly, the real-time segmentation system 206 can temporarily supplement the univariate time series with proxy variables to more accurately determine time series segments.

To illustrate, the first series of acts 700 includes an act 704 of generating real-time proxy variables based on the univariate time series data points. For example, the real-time segmentation system 206 generates one or more proxy variables (e.g., proxy variable time series) from the univariate time series 720 (shown as the time series Ui).

As noted above, proxy variables can include a wide range of time series types. For example, a proxy variable may be based on almost any function. In many instances, the real-time segmentation system 206 generates a proxy variable by applying a function that includes the time series, such as an interpolation or regression of the time series. In some instances, the real-time segmentation system 206 generates a proxy variable from a function or selects a previously generated proxy variable that does not include the univariate time series.

To illustrate, the act 704 includes to sub-act paths. The first sub-act path corresponds to generating an interpolated proxy variable and includes the sub-act 706 of identifying a buffer window having a first set of stored sample points as the sub-act 708 of interpolating a first real-time proxy variable from the first set of stored sample points using an interpolation function. The second sub-act path corresponds to polynomial proxy variables and includes the sub-act 710 of generating a second real-time proxy variable from a polynomial function.

As shown in the first sub-act path, the real-time segmentation system 206 identifies a buffer window having a first set of stored sample points (e.g., the sub-act 706). In various implementations, the real-time segmentation system 206 utilizes a buffer window 722 that includes a limited number of the sample points 726. In some implementations, the buffer window 722 includes all of the incoming real-time data points for the univariate time series 720. In various implementations, the buffer window 722 includes less than all (e.g., a subset) of the real-time data points received for the univariate time series 720 (e.g., 60%, 67%, 75%, 80%, 90%).

In many implementations, the buffer window 722 is larger than the current data window 714. For example, the buffer window 722 is 10-15 times the size of the current data window 714. In other cases, the buffer window 722 is slightly larger than the current data window 714 (e.g., 1.5-5 times). By being larger than the current data window 714, the buffer window 722 facilitates a more accurate interpolation of the univariate time series.

In many instances, however, the real-time segmentation system 206 stores less than all of the real-time data points in the time series segment (e.g., since the last segmentation timestamp) unless the last segmentation timestamp happened recently and is within the buffer window 722, In this way, the real-time segmentation system 206 stores only a limited number of reduce data points, which reduces memory requirements.

As shown in the sub-act 708, the real-time segmentation system 206 interpolates a first real-time proxy variable (i.e., pv1) from the first set of stored sample points using an interpolation function. For example, the first real-time proxy variable is based on a linear interpolation function of the limited number of the sample points 726 within the buffer window 722. Thus, rather than using all of the data points from the univariate time series or the last time series segment of the univariate time series, the real-time segmentation system 206 saves computational and memory resources by utilizing the buffer window 722 to determine one or more real-time proxy variables.

In various implementations, the real-time segmentation system 206 generates additional proxy variables from the same limited number of the sample points 726 within the buffer window 722. For example, the real-time segmentation system 206 utilizes different linear and non-linear interpolation functions to generate additional real-time proxy variables for the univariate time series 720.

Additionally, as shown in the second sub-act path, the real-time segmentation system 206 performs the sub-act 710 of generating a second real-time proxy variable from a polynomial function. As mentioned above, polynomial functions are independent of the time series data points. For example, the second real-time proxy variable (i.e., pv2) is generated by the function $x=\sin(\theta)$. The real-time segmentation system 206 may create additional or different polynomial proxy variables to correspond to the univariate time series 720.

Additionally, the real-time segmentation system 206 supplements the univariate time series 720 with the proxy variables to generate the multivariate time series discussed above. To illustrate, the first series of acts 700 includes an act 712 generating the multivariate time series by supplementing the univariate time series 720 with the real-time proxy variables. Indeed, in various instances, the real-time segmentation system 206 generates the multivariate time series by adding, augmenting, overlaying, and/or combining the proxy variables with the univariate time series 720.

Upon generating the multivariate time series, the real-time segmentation system 206 may use it to perform real-time time series segmentation. For example, the real-time segmentation system 206 utilizes the multivariate time series as described above in connection with FIGS. 3-6. For example, the current data window shown with the act 712 is the current data window 114 described above in the sub-act 304.

The real-time segmentation system 206 may add any number of proxy variables. For example, the real-time segmentation system 206 determines how many proxy variables to add to the univariate time series 720 to generate the multivariate time series. For instance, the real-time segmentation system 206 adds 20 proxy variables. In another instance, the real-time segmentation system 206 adds 6-10 proxy variables. Generally, the real-time segmentation system 206 adds fewer proxy variables than the number of data points in the buffer window 722, but the real-time segmentation system 206 is designed to operate with any number of proxy variables.

In one or more implementations, the real-time segmentation system 206 selects proxy variable parameters based on the data type of the time series. For instance, the real-time segmentation system 206 selects a first set of proxy variables with which to supplement a time series of a first data type and selects a second set of proxy variables with which to supplement a time series of a second data type. For example, the real-time segmentation system 206 applies a set of proxy variables to a fitness-based time series and another set of proxy variables to a market-based time series.

One important consideration is that proxy variables should be non-correlated. For example, if two proxy variables are correlated, they maintain a constant correlation with each other over time (e.g., or the correlation is constant above a correlation deviation threshold). In these instances, the two proxy variables similarly influence the time series. In other words, the proxy variables share a common correlation with the time series over time, which inaccurately influences the time series (e.g., it doubles the weight of the time series across graph objects). Accordingly, the real-time segmentation system 206 prevents and/or removes proxy variables that are correlated with each other.

As data for the univariate time series continues to be received in real time, the real-time segmentation system 206 may likewise update the proxy variables. For example, the real-time segmentation system 206 updates the real-time data points in the buffer window 722 and updates the proxy variables based on the updated data point, where applicable. To illustrate, FIG. 7B shows the second series of acts 730 that details this process.

As shown, the second series of acts 730 includes a sub-act 732 of receiving additional data points for the univariate time series filling up the next instance of the current data window 714. For example, the real-time segmentation system 206 receives additional real-time data points from a data source.

Additionally, the second series of acts 730 includes an act 734 of updating the real-time proxy variables based on the updated data points. As shown, the act 734 includes the same sub-act paths discussed above in connection with FIG. 7A. For example, the first sub-act path corresponding to generating the interpolated proxy variable includes the sub-act 736 of identifying a new buffer window having a second set of stored sample points. In various implementations, the real-time segmentation system 206 identifies updated sample points 746 within the updated buffer window 742.

For example, as the current data window 714 fills with real-time data points and moves forward in time, the buffer window can likewise advance in time. In various implementations, the updated buffer window 742 is the same size as the buffer window 722 (e.g., it is the same time duration and/or includes the same number of sample points) but includes more recently received data points of the univariate time series 720.

Additionally, as the buffer window updates in time, the real-time segmentation system 206 may remove, delete, or overwrite stored sample points no longer located within the updated buffer window 742. For example, in updating the first set of sample points to the second set of sample points, the real-time segmentation system 206 adds new data points and removes the oldest data points from the buffer window 722 no longer located within the updated buffer window 742. In this way, the real-time segmentation system 206 maintains its limited storage of sample points.

As shown, the first sub-act path also includes the sub-act 738 of updating the first real-time proxy variable from the second set of stored sample points using the interpolation function. For example, the real-time segmentation system 206 utilizes the same interpolation function as before with the second set of sample points within the updated buffer window 742. As shown, because the second set of sample points (e.g., the updated sample points 746) are different from the first set of sample points (e.g., the limited number of the sample points 726), the updated version of the first real-time proxy variable differs from the previous version (e.g., downward sloping verses upward sloping).

The real-time segmentation system 206 may update all of the interpolated proxy variables based on the second set of sample points. Indeed, as the current data window and/or the buffer window continue to progress and identify new real-time data points, the real-time segmentation system 206 may continue to determine updated interpolated proxy variables for the univariate time series 720. Likewise, the real-time segmentation system 206 may continue to recycle the limited number of stored sample points that correspond to the current version of the buffer window to maintain the limited number of stored sample points.

As shown in the act 734, the second sub-act path corresponding to polynomial proxy variables includes a sub-act 740 of maintaining the second real-time proxy variable from the polynomial function. In these implementations, because the polynomial function is not dependent upon the data points of the univariate time series 720, the real-time segmentation system 206 need not update any polynomial proxy variables.

Further, as shown in FIG. 7B, the second series of acts 730 includes an act 744 of providing additional multivariate time series data points based on the additional data points of the univariate time series and the updated proxy variables. In various implementations, the real-time segmentation system 206 updates the supplemented multivariate time series based on the newly received data points in the and the updated proxy variables. The real-time segmentation system 206 can continue the process of updating and provide the real-time version of the generated multivariate time series for time series segmentation, as described above.

Notably, when generating a multivariate time series from a supplemented version of the univariate time series, the real-time segmentation system 206 can utilize a similarity model having a conditional similarity function, as described above. In this manner, the real-time segmentation system 206 need not consider relationships between proxy variables that do not involve the univariate time series itself, thus reducing processing requirements when determining a time series segment for the univariate time series.

Figure 8:
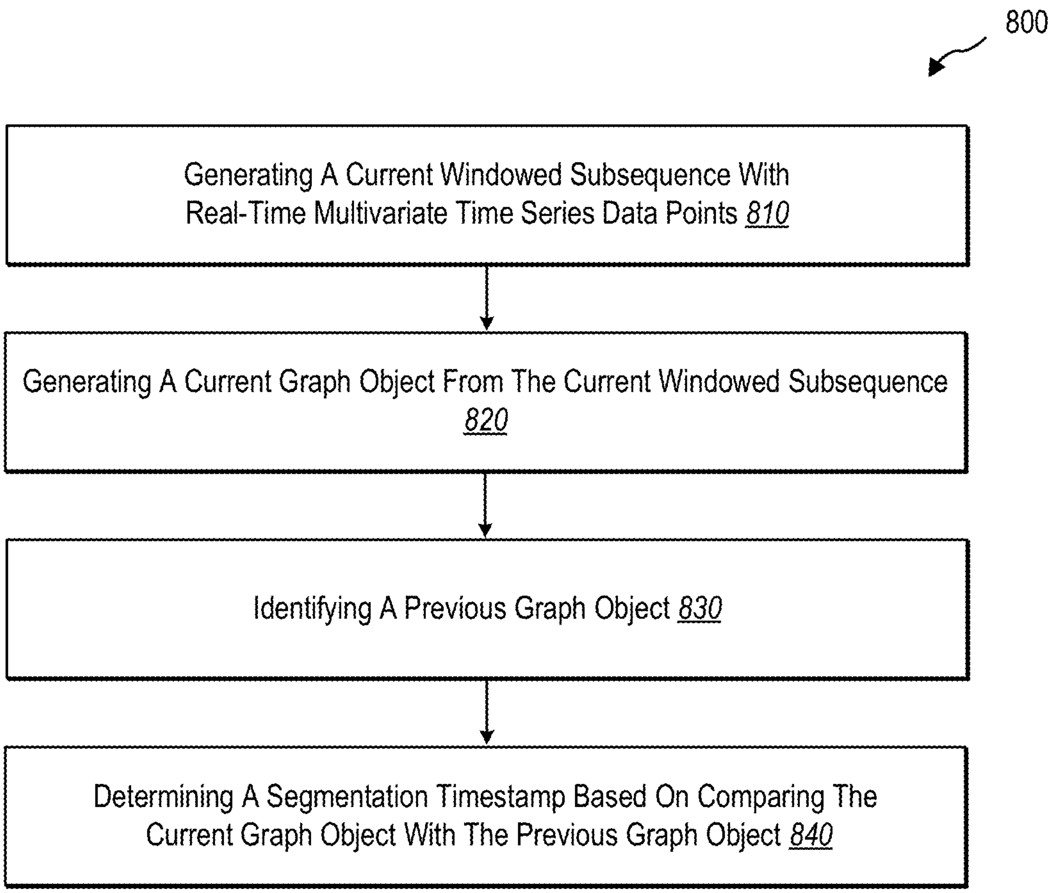
FIG. 8 illustrates an example series of acts for determining segmentation timestamps for real-time time series data.

Turning now to FIG. 8, this figure illustrates an example flowchart that includes a series of acts 800 for utilizing the real-time segmentation system 206 in accordance with one or more implementations. In particular, FIG. 8 illustrates an example series of acts (as part of a computer-implemented method) for generating segmented time series data in accordance with one or more implementations.

While FIG. 8 illustrates acts according to one or more implementations, alternative implementations may omit, add to, reorder, and/or modify any of the acts shown. Further, the acts of FIG. 8 can be performed as part of a method such as a computer-implemented method. Alternatively, a non-transitory computer-readable medium can include instructions that, when executed by a processing system comprising a processor, cause a computing device to perform the acts of FIG. 8. In still further implementations, a system can perform (e.g., a processing system with processor can cause instructions to be performed) the acts of FIG. 8.

In one or more implementations, the series of acts 800 includes a system that stores various components. For example, the system stores a sparse graph recovery model that generates graph objects from portions of multivariate time series data, a previous graph object generated by the sparse graph recovery model, and/or a similarity model that determines differences between the graph objects. In various implementations, the system includes a processor and computer memory including instructions that, when executed by the processor, cause the system to carry out various operations.

As shown, the series of acts 800 includes an act 810 of generating a current windowed subsequence with real-time multivariate time series data points. For example, the act 810 involves generating a current windowed subsequence by filling a current data window with multivariate time series data points received in real time.

In various implementations, the act 810 also includes receiving a univariate time series in real-time, generating multiple real-time proxy variables based on the univariate time series received in real time, and generating a multivariate time series that includes the multivariate time series data points by supplementing the univariate time series with the real-time proxy variable. In some implementations, the act 810 includes interpolating sample points along a portion of the univariate time series. In one or more implementations, the portion of the univariate time series is less than the length of the univariate time series, and/or the portion of the univariate time series is defined by a buffer window that is larger than the current data window. In some implementations, the current data window is based on a fixed window size used to generate new current windowed subsequences from the multivariate time series data points as new data points are received in real time.

As further shown, the series of acts 800 includes an act 820 of generating a current graph object from the current windowed subsequence. For instance, in example implementations, the act 820 involves generating a current graph object from the current windowed subsequence utilizing a sparse graph recovery model. In various implementations, the act 820 includes utilizing a conditional independence sparse graph recovery model that generates graph objects that exhibit a partial correlation between variables.

As further shown, the series of acts 800 includes an act 830 of identifying a previous graph object. For instance, in example implementations, the act 830 involves identifying a previous graph object generated by the sparse graph recovery model. In some implementations, the previous graph object corresponds to a previous current graph object previously generated by the sparse graph recovery model.

As further shown, the series of acts 800 includes an act 840 of determining a segmentation timestamp based on comparing the current graph object with the previous graph object. For instance, in example implementations, the act 840 involves determining a segmentation timestamp when a segment changes in multivariate time series data occurs based on comparing the current graph object with the previous graph object utilizing a similarity model.

In one or more implementations, the act 840 includes comparing a distance between the current graph object and the previous graph object with a difference threshold. In some implementations, comparing the current graph object with the previous graph object utilizing the similarity model includes determining a first-order distance that generates a distance metric between the current graph object and the previous graph object. In various implementations, comparing the current graph object with the previous graph object utilizing the similarity model further includes determining a second-order distance that generates absolute values based on the first-order distance.

In some implementations, the act 840 includes deleting storage of graph objects created before the current graph object and the previous graph object and maintaining, before determining the segmentation timestamp, first-order distance metrics are determined between each graph object and its previous graph object since the last segmentation timestamp for a multivariate time series that includes the multivariate time series data points. In various implementations, the difference threshold is based on a function of the first-order distance metrics maintained since the last segmentation timestamp for the multivariate time series.

In various implementations, the act 840 includes deleting the first-order distance metrics maintained since the last segmentation timestamp upon determining the segmentation timestamp. In some instances, the similarity model is a conditional similarity model that is conditioned on the univariate time series to ignore graph object connections in graph objects between two multiple proxy variable time series. In some instances, generating the current graph object from the current windowed subsequence includes generating a current visual graph of nodes and edges, where the edges indicate a positive or negative correlation between connected nodes. In one or more implementations, the act 840 also includes generating a segmented univariate time series based on the univariate time series and the segmentation timestamp.

In some implementations, the series of acts 800 includes additional acts. For example, the series of acts 800 includes an act of generating a segmented multivariate time series based on the segmentation timestamp and the multivariate time series data.

In one or more implementations, the series of acts 800 includes generating a real-time proxy variable time series for a univariate time series received in real time, generating a multivariate time series of real-time data by supplementing the univariate time series received in real time with the real-time proxy variable time series, generating a current windowed subsequence by filling a current data window with data points from the multivariate time series, generating a current graph object from the current windowed subsequence utilizing a sparse graph recovery model, identifying a previous graph object generated by the sparse graph recovery model, and/or determining a segmentation timestamp when a segment change occurs in multivariate time series data based on comparing the current graph object with the previous graph object utilizing a similarity model.

In various implementations, the real-time proxy variable time series includes a polynomial time series generated from a first function and/or an interpolated time series generated from a second function based on sample points along a portion of the univariate time series. In some instances, the series of acts 800 also includes updating or re-interpolating the interpolated time series based on a new set of sample points along a new portion of the univariate time series upon generating a new current windowed segment upon receiving additional data points for the univariate time series.

Figure 9:
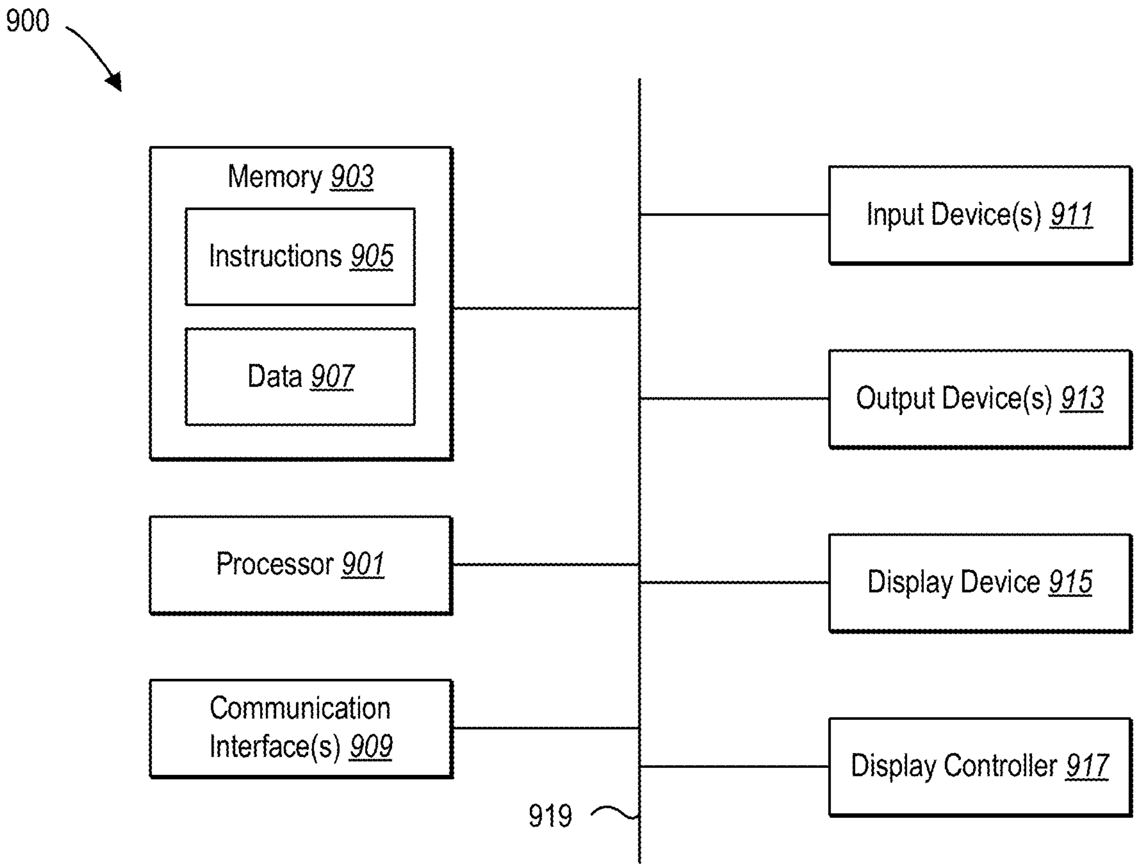
FIG. 9 illustrates example components included within a computer system.

FIG. 9 illustrates certain components that may be included within a computer system 900. The computer system 900 may be used to implement the various computing devices, components, and systems described herein (e.g., by performing computer-implemented instructions). As used herein, a "computing device" refers to electronic components that perform a set of operations based on a set of programmed instructions. Computing devices include groups of electronic components, client devices, server devices, etc.

In various implementations, the computer system 900 represents one or more of the client devices, server devices, or other computing devices described above. For example, the computer system 900 may refer to various types of network devices capable of accessing data on a network, a cloud computing system, or another system. For instance, a client device may refer to a mobile device such as a mobile telephone, a smartphone, a personal digital assistant (PDA), a tablet, a laptop, or a wearable computing device (e.g., a headset or smartwatch). A client device may also refer to a non-mobile device such as a desktop computer, a server node (e.g., from another cloud computing system), or another non-portable device.

The computer system 900 includes a processing system including a processor 901. The processor 901 may be a general-purpose single- or multi-chip microprocessor (e.g., an Advanced Reduced Instruction Set Computer (RISC) Machine (ARM)), a special-purpose microprocessor (e.g., a digital signal processor (DSP)), a microcontroller, a programmable gate array, etc. The processor 901 may be referred to as a central processing unit (CPU) and may cause computer-implemented instructions to be performed. Although the processor 901 shown is just a single processor in the computer system 900 of FIG. 9, in an alternative configuration, a combination of processors (e.g., an ARM and DSP) could be used.

The computer system 900 also includes memory 903 in electronic communication with the processor 901. The memory 903 may be any electronic component capable of storing electronic information. For example, the memory 903 may be embodied as random-access memory (RAM), read-only memory (ROM), magnetic disk storage media, optical storage media, flash memory devices in RAM, on-board memory included with the processor, erasable programmable read-only memory (EPROM), electrically erasable programmable read-only memory (EEPROM), registers, and so forth, including combinations thereof.

The instructions 905 and the data 907 may be stored in the memory 903. The instructions 905 may be executable by the processor 901 to implement some or all of the functionality disclosed herein. Executing the instructions 905 may involve the use of the data 907 that is stored in the memory 903. Any of the various examples of modules and components described herein may be implemented, partially or wholly, as instructions 905 stored in memory 903 and executed by the processor 901. Any of the various examples of data described herein may be among the data 907 that is stored in memory 903 and used during the execution of the instructions 905 by the processor 901.

A computer system 900 may also include one or more communication interface(s) 909 for communicating with other electronic devices. The one or more communication interface(s) 909 may be based on wired communication technology, wireless communication technology, or both. Some examples of the one or more communication interface (s) 909 include a Universal Serial Bus (USB), an Ethernet adapter, a wireless adapter that operates in accordance with an Institute of Electrical and Electronics Engineers (IEEE) 902.11 wireless communication protocol, a Bluetooth® wireless communication adapter, and an infrared (IR) communication port.

A computer system 900 may also include one or more input device(s) 911 and one or more output device(s) 913. Some examples of the one or more input device(s) 911 include a keyboard, mouse, microphone, remote control device, button, joystick, trackball, touchpad, and light pen. Some examples of the one or more output device(s) 913 include a speaker and a printer. A specific type of output device that is typically included in a computer system 900 is a display device 915. The display device 915 used with implementations disclosed herein may utilize any suitable image projection technology, such as liquid crystal display (LCD), light-emitting diode (LED), gas plasma, electroluminescence, or the like. A display controller 917 may also be provided, for converting data 907 stored in the memory 903 into text, graphics, and/or moving images (as appropriate) shown on the display device 915.

The various components of the computer system 900 may be coupled together by one or more buses, which may include a power bus, a control signal bus, a status signal bus, a data bus, etc. For clarity, the various buses are illustrated in FIG. 9 as a bus system 919.

In addition, the network described herein may represent a network or a combination of networks (such as the Internet, a corporate intranet, a virtual private network (VPN), a local area network (LAN), a wireless local area network (WLAN), a cellular network, a wide area network (WAN), a metropolitan area network (MAN), or a combination of two or more such networks) over which one or more computing devices may access the real-time segmentation system 206. Indeed, the networks described herein may include one or multiple networks that use one or more communication platforms or technologies for transmitting data. For example, a network may include the Internet or other data link that enables transporting electronic data between respective client devices and components (e.g., server devices and/or virtual machines thereon) of the cloud computing system.

Further, upon reaching various computer system components, program code means in the form of computer-executable instructions or data structures can be transferred automatically from transmission media to non-transitory computer-readable storage media (devices), or vice versa. For example, computer-executable instructions or data structures received over a network or data link can be buffered in random-access memory (RAM) within a network interface module (NIC), and then it is eventually transferred to computer system RAM and/or to less volatile computer storage media (devices) at a computer system. Thus, it should be understood that non-transitory computer-readable storage media (devices) can be included in computer system components that also (or even primarily) utilize transmission media.

Computer-executable instructions include instructions and data that, when executed by a processor, cause a general-purpose computer, special-purpose computer, or special-purpose processing device to perform a certain function or group of functions. In some implementations, computer-executable and/or computer-implemented instructions are executed by a general-purpose computer to turn the general-purpose computer into a special-purpose computer implementing elements of the disclosure. The computer-executable instructions may include, for example, binaries, intermediate format instructions such as assembly language, or even source code. Although the subject matter has been described in language specific to structural features and/or methodological acts, it is to be understood that the subject matter defined in the appended claims is not necessarily limited to the described features or acts described above. Rather, the described features and acts are disclosed as example forms of implementing the claims.

Those skilled in the art will appreciate that the disclosure may be practiced in network computing environments with many types of computer system configurations, including, personal computers, desktop computers, laptop computers, message processors, hand-held devices, multi-processor systems, microprocessor-based or programmable consumer electronics, network PCs, minicomputers, mainframe computers, mobile telephones, PDAs, tablets, pagers, routers, switches, and the like. The disclosure may also be practiced in distributed system environments where local and remote computer systems, which are linked (either by hardwired data links, wireless data links, or a combination of hardwired and wireless data links) through a network, both perform tasks. In a distributed system environment, program modules may be located in both local and remote memory storage devices.

The techniques described herein may be implemented in hardware, software, firmware, or any combination thereof unless specifically described as being implemented in a specific manner. Any features described as modules, components, or the like may also be implemented together in an integrated logic device or separately as discrete but interoperable logic devices. If implemented in software, the techniques may be realized at least in part by a non-transitory processor-readable storage medium including instructions that, when executed by at least one processor, perform one or more of the methods described herein (including computer-implemented methods). The instructions may be organized into routines, programs, objects, components, data structures, etc., which may perform particular tasks and/or implement particular data types, and which may be combined or distributed as desired in various implementations.

Computer-readable media can be any available media that can be accessed by a general-purpose or special-purpose computer system. Computer-readable media that store computer-executable instructions are non-transitory computer-readable storage media (devices). Computer-readable media that carry computer-executable instructions are transmission media. Thus, by way of example, implementations of the disclosure can include at least two distinctly different kinds of computer-readable media: non-transitory computer-readable storage media (devices) and transmission media.

As used herein, non-transitory computer-readable storage media (devices) may include RAM, ROM, EEPROM, CD-ROM, solid-state drives (SSDs) (e.g., based on RAM), Flash memory, phase-change memory (PCM), other types of memory, other optical disk storage, magnetic disk storage or other magnetic storage devices, or any other medium which can be used to store desired program code means in the form of computer-executable instructions or data structures and which can be accessed by a general-purpose or special-purpose computer.

The steps and/or actions of the methods described herein may be interchanged with one another without departing from the scope of the claims. In other words, unless a specific order of steps or actions is required for the proper operation of the method that is being described, the order and/or use of specific steps and/or actions may be modified without departing from the scope of the claims.

The term "determining" encompasses a wide variety of actions and, therefore, "determining" can include calculating, computing, processing, deriving, investigating, looking up (e.g., looking up in a table, a data repository, or another data structure), ascertaining, and the like. Also, "determining" can include receiving (e.g., receiving information), accessing (e.g., accessing data in a memory), and the like. Also, "determining" can include resolving, selecting, choosing, establishing, and the like.

The terms "comprising," "including," and "having" are intended to be inclusive and mean that there may be additional elements other than the listed elements. Additionally, it should be understood that references to "one implementation" or "implementations" of the present disclosure are not intended to be interpreted as excluding the existence of additional implementations that also incorporate the recited features. For example, any element or feature described concerning an implementation herein may be combinable with any element or feature of any other implementation described herein, where compatible.

The present disclosure may be embodied in other specific forms without departing from its spirit or characteristics. The described implementations are to be considered illustrative and not restrictive. The scope of the disclosure is indicated by the appended claims rather than by the foregoing description. Changes that come within the meaning and range of equivalency of the claims are to be embraced within their scope.

What is claimed is:

1. A computer-implemented method for generating segmented time series data comprising:

generating a current windowed subsequence by filling a current data window with multivariate time series data points received in real time;

generating a current graph object from the current windowed subsequence utilizing a sparse graph recovery model;

identifying a previous graph object generated by the sparse graph recovery model; and determining, in real time, a segmentation timestamp when a segment changes in multivariate time series data occurs based on comparing the current graph object with the previous graph object utilizing a similarity model.

2. The computer-implemented method of claim 1 wherein determining the segmentation timestamp based on comparing the current graph object with the previous graph object utilizing the similarity model comprises comparing a distance between the current graph object and the previous graph object with a difference threshold.

3. The computer-implemented method of claim 2, wherein comparing the current graph object with the previous graph object utilizing the similarity model comprises determining a first-order distance that generates a distance metric between the current graph object and the previous graph object.

4. The computer-implemented method of claim 3, wherein comparing the current graph object with the previous graph object utilizing the similarity model further comprises determining a second-order distance that generates absolute values based on the first-order distance.

5. The computer-implemented method of claim 4, further comprising:

deleting storage of graph objects created before the current graph object and the previous graph object; and maintaining, before determining the segmentation timestamp, first-order distance metrics are determined between each graph object and its previous graph object since a last segmentation timestamp for a multivariate time series that includes the multivariate time series data points.

6. The computer-implemented method of claim 5, wherein the difference threshold is based on a function of the first-order distance metrics maintained since the last segmentation timestamp for the multivariate time series.

7. The computer-implemented method of claim 6, further comprising deleting the first-order distance metrics maintained since the last segmentation timestamp upon determining the segmentation timestamp.

8. The computer-implemented method of claim 1, further comprising generating a segmented time series based on the multivariate time series data points and the segmentation timestamp.

9. The computer-implemented method of claim 1, further comprising:

receiving a univariate time series in real time;

generating multiple real-time proxy variables based on the univariate time series received in real time; and generating a multivariate time series that includes the multivariate time series data points by supplementing the univariate time series with the multiple real-time proxy variables.

10. The computer-implemented method of claim 9, wherein generating the multiple real-time proxy variables based on the univariate time series comprises interpolating sample points along a portion of the univariate time series.

11. The computer-implemented method of claim 10, wherein:

the portion of the univariate time series is less than a length of the univariate time series; and the portion of the univariate time series includes a buffer window that is larger than the current data window.

12. The computer-implemented method of claim 9, wherein:

the similarity model is a conditional similarity model that is conditioned on the univariate time series to ignore graph object connections in graph objects between two multiple proxy variable time series; and generating the current graph object from the current windowed subsequence includes generating a current visual graph of nodes and edges, where the edges indicate a positive or negative correlation between connected nodes.

13. The computer-implemented method of claim 12, further comprising generating a segmented univariate time series based on the univariate time series and the segmentation timestamp.

14. A system comprising:

memory having:

a sparse graph recovery model that generates graph objects from portions of multivariate time series data;

a previous graph object generated by the sparse graph recovery model; and a similarity model that determines differences between the graph objects;

a processor; and a computer memory comprising instructions that, when executed by the processor, cause the system to perform operations comprising:

generating a current windowed subsequence by filling a current data window with multivariate time series data points being received in real time;

generating a current graph object from the current windowed subsequence utilizing the sparse graph recovery model;

determining, in real time, a segmentation timestamp based on comparing the current graph object with the previous graph object utilizing the similarity model; and generating a segmented time series based on the multivariate time series data points and the segmentation timestamp.

15. The system of claim 14, wherein the previous graph object corresponds to a previous current graph object previously generated by the sparse graph recovery model.

16. The system of claim 14, wherein the current data window is used to generate new current windowed subsequences from the multivariate time series data points as new data points are received in real time.

17. The system of claim 14, wherein generating the graph objects from the current windowed subsequence includes utilizing a conditional independence sparse graph recovery model that generates graph objects that indicates a partial correlation between variables.

18. A computer-implemented method for generating segmented time series data comprising:

generating a real-time proxy variable time series for a univariate time series received in real time;

generating a multivariate time series of real-time data by supplementing the univariate time series received in real time with the real-time proxy variable time series;

generating a current windowed subsequence by filling a current data window with data points from the multivariate time series;

generating a current graph object from the current windowed subsequence utilizing a sparse graph recovery model;

identifying a previous graph object generated by the sparse graph recovery model; and determining, in real time, a segmentation timestamp when a segment change occurs in multivariate time series data based on comparing the current graph object with the previous graph object utilizing a similarity model.

19. The computer-implemented method of claim 18, wherein the real-time proxy variable time series comprises:

a polynomial time series generated from a first function; and an interpolated time series generated from a second function based on sample points along a portion of the univariate time series.

20. The computer-implemented method of claim 19, further comprising updating the interpolated time series based on a new set of sample points along a new portion of the univariate time series upon generating a new current windowed segment upon receiving additional data points for the univariate time series.

* * * * *